United States Patent
Schulze et al.

(10) Patent No.: US 12,373,614 B2
(45) Date of Patent: *Jul. 29, 2025

(54) TECHNIQUES FOR UTILITY STRUCTURE MODELING AND SIMULATION

(71) Applicant: Bentley Systems, Incorporated, Exton, PA (US)

(72) Inventors: William Schulze, Westerville, OH (US); Brett Willitt, East Aurora, NY (US); David Cain, Delaware, OH (US); Michael H. Ford, Marysville, OH (US); Kevan Kramb, Columbus, OH (US); Timothy G. S. Overly, Worthington, OH (US); Michael Ratliff, Gahanna, OH (US); Jeremy Wentworth, Columbus, OH (US)

(73) Assignee: Bentley Systems, Incorporated, Exton, PA (US)

( * ) Notice: Subject to any disclaimer, the term of this patent is extended or adjusted under 35 U.S.C. 154(b) by 4 days.

This patent is subject to a terminal disclaimer.

(21) Appl. No.: 18/600,344

(22) Filed: Mar. 8, 2024

(65) Prior Publication Data

US 2024/0211657 A1     Jun. 27, 2024

Related U.S. Application Data

(63) Continuation of application No. 16/764,745, filed as application No. PCT/US2019/019208 on Feb. 22, 2019, now Pat. No. 11,960,803.

(Continued)

(51) Int. Cl.
G06F 30/13     (2020.01)

(52) U.S. Cl.
CPC .................... *G06F 30/13* (2020.01)

(58) Field of Classification Search
CPC ...... G06F 30/23; G06F 30/12; G06F 2111/02; G06F 2111/10; G06F 30/13
See application file for complete search history.

(56) References Cited

U.S. PATENT DOCUMENTS

| 2002/0056501 A1 | 5/2002 | Bingel, III et al. |
| 2003/0135621 A1 | 7/2003 | Romagnoli |

(Continued)

FOREIGN PATENT DOCUMENTS

| NZ | 542989 A | 5/2008 |
| WO | WO-2009-154632 A1 | 12/2009 |

OTHER PUBLICATIONS

Ludwig, "Radial Diagrams for the Visual Analysis of Wind Energy Production Data", Oct. 2018, Master's Thesis, Vienna University of Technology (Year: 2018).*

(Continued)

*Primary Examiner* — David A Hopkins
(74) *Attorney, Agent, or Firm* — Cesari and McKenna, LLP; James A. Blanchette

(57) ABSTRACT

Systems and methods are described for modeling and analyzing utility structures according to applied loads. Particularly, a model engine can utilize inputs related to a utility structure, environmental conditions to which the utility structure is subjected, and engineering standards expected of the utility structure, and analyze the structure's loading and performance based on analysis configuration inputs. An engine or multiple engines can be run locally or can be instantiated in a cloud to assist with multiple or complex calculations. Hybrid and geometric non-linear analyses and outputs can be performed or provided.

15 Claims, 23 Drawing Sheets

Related U.S. Application Data

(60) Provisional application No. 62/634,532, filed on Feb. 23, 2018.

(56) References Cited

U.S. PATENT DOCUMENTS

| | | | |
|---|---|---|---|
| 2004/0267513 | A1 | 12/2004 | Westermann et al. |
| 2012/0130683 | A1 | 5/2012 | Andoji et al. |
| 2013/0173227 | A1 | 7/2013 | Rousselle |
| 2016/0196375 | A1 | 7/2016 | Nasle |
| 2018/0266809 | A1 | 9/2018 | Chen et al. |
| 2020/0387651 | A1* | 12/2020 | Schulze .................. G06F 30/12 |

OTHER PUBLICATIONS

Shi, Cong, et al. "COSMOS: Computation offloading as a service for mobile devices." Proceedings of the 15th ACM international symposium on Mobile ad hoc networking and computing. 2014. (Year: 2017).*

Górnisiewicz, K., Palka, Z. & Ratajczak, W. Measuring the similarity of charts in graphical statistics. Sci Rep 14, 6893 (2024) (Year: 2024).*

Brakke, Bruce, et al. "Field Instrumentation, Testing, and Long-Term Monitoring of High-Mast Lighting Towers in the State of Iowa." (2006). URL: publications(dot)iowa(dot)gov/20052/1/IADOT_tr_518_Field_Instrumentation_Testing_Long_Term_Monitor_High_Mast_Towers_Iowa_2006(dot)pdf (Year: 2006).*

Smith, Andrew David. "Real-time health monitoring system for mast-arm sign support structures." (2010). Master's Thesis. Marquette University. pp. 111-122 (Year: 2010).*

Dimitrov, N., R. D. Bitsche, and J. P. Blasques. "Spatial reliability analysis of a wind turbine blade cross section subjected to multi-axial extreme loading." Structural Safety 66 (2017): 27-37. Abstract, figure 8. (Year: 2017).*

Harpley, Adam, "Measurements of Important Meteorological Parameters' Variations in the Akron Area" (2017). Honors Research Projects. 449. University of Akron (Year: 2017).*

Akherfi, Khadija, Micheal Gerndt, and Hamid Harroud. "Mobile Cloud Computing for Computation Offloading: Issues and Challenges." Applied Computing and Informatics 14.1 (2018): 1-16. (Year: 2018).

Angin, Pelin, Bharat Bhargava, and Zhongjun Jin. "A Self-Cloning Agents Based Model for High-Performance Mobile-Cloud Computing." 2015 IEEE 8th International Conference on Cloud Computing. IEEE, 2015. (Year: 2015).

Ari, Ismail, et al., "Design and Implementation of a Cloud Computing Service for Infinite Elements Analysis," Civil-Comp Ltd and Elsevier Ltd, Elsevier, SciVerse ScienceDirect, Advances in Engineering Software, vol. 60-61, Jun. 1, 2013, pp. 122-135.

Battista, Ronalda C., Rosangela S. Rodrigues, and Michele S. Pfeil. "Dynamic Behavior and Stability of Transmission Line Towers Under Wind Forces." Journal of Wind Engineering and Industrial Aerodynamics 91.8 (2003): 1051-1067. (Year: 2003).

Belevicius, Rimantas, et al. "Optimization of Rigidly Supported Guyed Masts." Advances in Civil Engineering 2017 (2017). See the abstract and p. 4, col. 1, paragraphs 3-4; also see pp. 5-6 (Year: 2017).

Brewer, Wesley, William Scott, and John Sanford. "An Integrated Cloud Platform for Rapid Interface Generation, Job Scheduling, Monitoring, Plotting, and Case Management of Scientific Applications." 2015 International Conference on Cloud Computing Research and Innovation (ICCCRI). IEEE, 2015. (Year: 2015).

Chae, Dongju, et al. "CMcloud: Cloud Platform For Cost-Effective Offloading of Mobile Applications." 2014 14th IEEE/ACM International Symposium on Cluster, Cloud and Grid Computing. IEEE, 2014. (Year: 2014).

Chen, Shen-En, and Kaoshan Dai. "Modal Characteristics of Two Operating Power Transmission Poles." Shock and Vibration 17.4-5 ( 2010): 551-561. (Year: 2010).

Clapp, Allen L., et al., "Loading & Strengths Calculations for Wood Pole Lines," Part I: Loading & Strengths, Part II: SPIDAcalc Software Tutorial, PCUTraining.com, Power & Communication Utility Training, Spokane, WA, Feb. 22-25, 2016, pp. 1-2.

"European Search Report and Written Opinion," European Application No. 19 758 172.1-1224, Date of Mailing: Aug. 11, 2021, pp. 1-18.

Feng, Xiao Dong, et al. "Effect of The Dynamic Characteristic of Long-Span Transmission Tower on High Voltage Transmission Line." Applied Mechanics and Materials 687 (2014): 3423-3426. See pp. 3423-3245 (Year: 2014).

Fengli, Yang, et al. "Numerical Simulation on the HV Transmission Tower-Line System Under Ice Shedding." 2009 Transmission & Distribution Conference & Exposition: Asia and Pacific. IEEE, 2009. See the abstract and§ II (Year: 2009).

Flores, Huber, et al. "Large-scale Offloading in the Internet of Things." 2017 IEEE International Conference on Pervasive Computing and Communications Workshops (PerCom Workshops). IEEE, 2017. (Year: 2017).

Gantikow, Holger, Sebastian Klingberg, and Christoph Reich. "Container-based Virtualization for HPC." Closer. 2015. (Year: 2015).

Hamada, A., and A. A. El Damatty. "Failure Analysis of Guyed Transmission Lines During F2 Tornado Event." Engineering Structures 85 (2015): 11-25. See the abstract and§§ 4-4.3 (Year: 2015).

Hausfather, Diego, "*Verification of SPIDACALC Software for Non-Linear Analysis of Distribution Poles: Appendices*," SPIDAWeb LLC, CIMA, Project No. T000514A, Jul. 11, 2016, pp. 1-138.

Hausfather, Diego, "*Verification of SPIDACALC Software for Non-Linear Analysis of Distribution Poles: Report*," SPIDAWeb LLC, CIMA, Project No. T000514A, Jul. 11, 2016, pp. 1-13.

Hausfather, Diego, "*Verification of SPIDACALC Software for Non-Linear Analysis of Distribution Poles: Appendices*," (Update for Version 6.4), SPIDAWeb LLC, CIMA, Project No. T000740A, Feb. 15, 2017, pp. 1-111.

Hausfather, Diego, "*Verification of SPIDACALC Software for Non-Linear Analysis of Distribution Poles: Report*," (Update for Version 6.4), SPIDAWeb LLC, CIMA, Project No. T000740A, Feb. 15, 2017, pp. 1-10.

Hausfather, Diego, "*Verification of SPIDACALC Software for Non-Linear Analysis of Distribution Poles: Appendices*," (Update for Version 7.0—JUMPER), SPIDAWeb LLC, CIMA, Project No. T000888A, Oct. 20, 2017, pp. 1-125.

Hausfather, Diego, "*Verification of SPIDACALC Software for Non-Linear Analysis of Distribution Poles: Report*," (Update for Version 7.0—JUMPER), SPIDAWeb LLC, CIMA, Project No. T000888A, Oct. 20, 2017, pp. 1-7.

IEEE, "Strengths & Loading Calculations for Wood Pole Lines Seminar (NESC)", IEEE Spokane Section, 2016 (Year: 2016).

IkeGPS, "Webinar: SPIDACalc & GE MapSight Weaving a Seamless Solution", YouTube Video, Aug. 20, 2015 (Year: 2015).

Kaoshan, Dai, "Dynamic Performance of Transmission Pole Structures Under Blasting Induced Ground Vibration", PhD Dissertation from the University of North Carolina at Charlotte, 2009. See the abstract, see pp. 31, 75-79, 100-101. (Year: 2009).

Kumar, Krishan, and Manish Kurhekar. "Economically Efficient Virtualization Over Cloud Using Docker Containers." 2016 IEEE international conference on cloud computing in emerging markets (CCEM). IEEE, 2016. (Year: 2016).

Li, Yunchun, and Yumeng Xia. "Auto-scaling Web Applications in Hybrid Cloud Based on Docker." 2016 5th International Conference on Computer Science and Network Technology (ICCSNT). IEEE, 2016. (Year: 2016).

Mathur, R. K., et al. "Dynamics of a Guyed Transmission Tower System." IEEE Transactions on Power Delivery 2.3 (1987): 908-916. See the abstract and p. 910 (Year: 1987).

McClure, G., and M. Lapointe. "Modeling the Structural Dynamic Response of Overhead Transmission Lines." Computers & Structures 81.8-11 (2003): 825-834. (Year: 2003).

Nashville Electric Service, Pole Attachment and Conduit Usage Guidelines, Sep. 15, 2016, accessed via the Nashville Electric Service website (Year: 2016).

(56) References Cited

OTHER PUBLICATIONS

Nevada Department of Taxation, Division of Local Government Services, "Expected Life Study: Telecommunications and Cable Assets", 2015, accessed via the Nevada Department of Taxation Website (Year: 2015).
"Notification of Transmittal of the International Search Report and the Written Opinion of the International Searching Authority, or the Declaration," International Filing Date: Feb. 22, 2019, International Application No. PCT/US2019/019208, Date of Mailing: Jun. 25, 2019, pp. 1-10.
O-Calc Pro, "Osmose O-Calc® Pro Theory of Operation", Nov. 2015, URL: o-calcpro(dot)com/wiki/2015/11/30/osmose-o-calc-pro-theory-of-operation/—see section 5.0 for the "Elongation of a Wire Rope" (Year: 2015).
O'Donnell, Arthur, et al., "Risk and Safety Aspects of Southern California Edison's 2018-2020 General Rate Case Application 16-09-001", Public Utilities Commission, State of California, Retrieved online: <https://www.cpuc.ca.gov/-/media/cpuc-website/divisions/safety-policy-division/reports/sce-2018-grc-report-final-with-appendix-a-013117.pdf>, Jan. 31, 2017, pp. 1-106.
O'Donnell, et al., State of California, Public Utilities Commission, "Risk and Safety Aspects of Southern California Edison's 2018-2020 General Rate Case Application 16-09-001", Jan. 31, 2017, accessed via the State of California's CPUC website (Year: 2017).
Power Line Systems, SAGSEC Product Page, URL: www(dot)powerlinesystems(dot)com/products/sagsec(dot)html, accessed via WayBack Machine archived in 2008, see paragraphs 1-4 (Year: 2008).
Power Line Systems, SAPS—"Structural Analysis of Power and communication Systems" Product Page, URL: www(dot)powerlinesystems(dot)com:80/products/saps(dot)html, accessed via WayBack Machine archived in 2004, see paragraphs1-3 and the "Summary of Features" section (Year: 2004).
"Release Notes for SPIDACALC 4.4.3.0," SPIDA Software, SPIDAWeb LLC., Dec. 31, 2012, pp. 1-2.
Roshan Fekr, Masoud. "Dynamic Response of Overhead Transmission Lines to Ice Shedding." (1995). Master's Thesis. McGill University. See the abstract and then see chapter 3, including §§ 3.2-3.4 (Year: 1995).
Shehata, A. Y., A. A. Ei Damatty, and E. Savory. "Finite Element Modeling of Transmission Line Under Downburst Wind Loading." Finite Elements in Analysis and Design 42.1 (2005): 71-89. See the abstract and§§ 5.1-5.2 (Year: 2005).
Shekhar, Shashank, et al. "A simulation as a Service Cloud Middleware." Annals of Telecommunications 71.3-4 (2016): 93-108. ( Year: 2016).
Southern California Edison, "2018 General Rate Case Rebuttal Testimony", Jun. 16, 2017, accessed via the State of California' CPUC website (Year: 2017).
"SPIDA® CALC 4.4.2.0—Release Notes," SPIDA Software, SPIDAWeb LLC., Jul. 15, 2013, pp. 1-3.
"SPIDA® CALC 4.4.3.0—Release Notes," SPIDA Software, SPIDAWeb LLC., Dec. 4, 2013, pp. 1-2.
"SPIDA® CALC 5.0.1.0—Release Notes," SPIDA Software, SPIDAWeb LLC., Feb. 21, 2014, pp. 1-7.
"SPIDA® CALC v5.2.0.0—Improved Sidewalk Brace Functionality," SPIDA Software, SPIDAWeb LLC., May 15, 2014, pp. 1-11.
"SPIDA® CALC v5.2.0.0—Release Notes," SPIDA Software, SPIDAWeb LLC., May 15, 2014, pp. 1-5.
"SPIDA® CALC v5.3.1.0—Release Notes," SPIDA Software, SPIDAWeb LLC., Nov. 21, 2014, pp. 1-6.
"SPIDA® CALC v5.3.2.0 FUTURA—Release Notes," SPIDA Software, SPIDAWeb LLC., Dec. 31, 2014, pp. 1-3.
"SPIDA® CALC v5.3.3.0—Release Notes," SPIDA Software, SPIDAWeb LLC., Jan. 22, 2015, pp. 1-3.
"SPIDA® CALC v5.3.4.0—Release Notes," SPIDA Software, SPIDAWeb LLC., Feb. 12, 2015, pp. 1-3.
"SPIDA® CALC 6.0.1.0—Client Editor and Engineering Appendix," SPIDA Software, SPIDAWeb LLC., May 21, 2015, pp. 1-8.
"SPIDA® CALC 6.0.1.0—New Features and Functionality," SPIDA Software, SPIDAWeb LLC., May 21, 2015, pp. 1-19.
"SPIDA® CALC 6.0.1.0—Release Notes," SPIDA Software, SPIDAWeb LLC., May 21, 2015, pp. 1-6.
"SPIDA® CALC v6.0.2.0—Release Notes," SPIDA Software, SPIDAWeb LLC., Jun. 12, 2015, pp. 1-3.
"SPIDA® CALC 6.0.3.0—Release Notes," SPIDA Software, SPIDAWeb LLC., Jul. 13, 2015, pp. 1-2.
"SPIDA® CALC 6.1.0.0—Release Notes," SPIDA Software, SPIDAWeb LLC., Jul. 24, 2015, pp. 1-5.
"SPIDA® CALC 6.1.1.0—Release Notes," SPIDA Software, SPIDAWeb LLC., Aug. 28, 2015, pp. 1-2.
"SPIDA® CALC 6.1.2.0—Release Notes," SPIDA Software, SPIDAWeb LLC., Nov. 24, 2015, pp. 1-3.
"SPIDA® CALC 6.2.0.0—Release Notes," SPIDA Software, SPIDAWeb LLC., Feb. 5, 2016, pp. 1-3.
"SPIDA® CALC 6.3.0.0—Release Notes," SPIDA Software, SPIDAWeb LLC., Jun. 8, 2016, pp. 1-4.
"SPIDA® CALC v6.4.0.0—Release Notes," SPIDA Software, SPIDAWeb LLC., Feb. 28, 2017, pp. 1-3.
"SPIDA® CALC v7.0.0—Jumper Release Notes," SPIDAWeb LLC., Dec. 6, 2017, pp. 1-4.
"SPIDA® CALC 6.X—Training Manual," SPIDAWeb LLC., Nov. 1, 2015, pp. 1-149.
"SPIDACALC v7.0—Training Manual," SPIDAWeb LLC., Feb. 22, 2018, pp. 1-167.
"*Spida™ Calc Calculation Documentation: SPIDA*," SPIDAWeb LLC., Mar. 30, 2010, pp. 1-19.
SPIDA Software, Tweet on Jun. 7, 2016 on Twitter (Year: 2016).
Wu, Song, et al. "Container-based Cloud Platform for Mobile Computation Offloading." 2017 IEEE international parallel and distributed processing symposium (IPDPS). IEEE, 2017. (Year: 2017).
Yang, Wen Gang, et al. "The Influence of Initial Guy Cable Prestress on Single-Mast Guyed Towers Mechanical Properties." Applied Mechanics and Materials 351 (2013): 55-60. See the abstract and pp. 56-58 (Year: 2013).
Zehe, Daniel, et al. "Tutorial on a Modeling and Simulation Cloud Service." 2015 Winter Simulation Conference (WSC). IEEE, 2015. ( Year: 2015).

\* cited by examiner

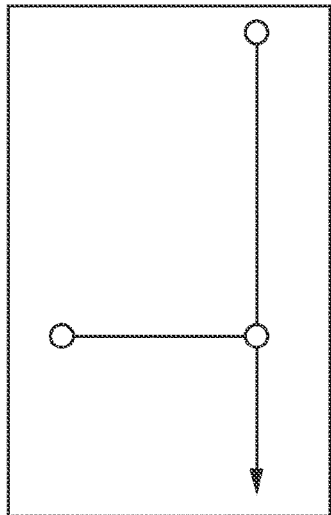
FIG. 6A

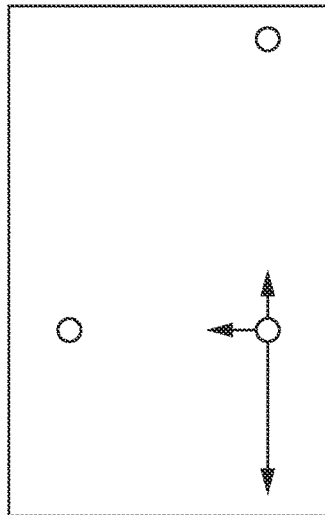
FIG. 6B

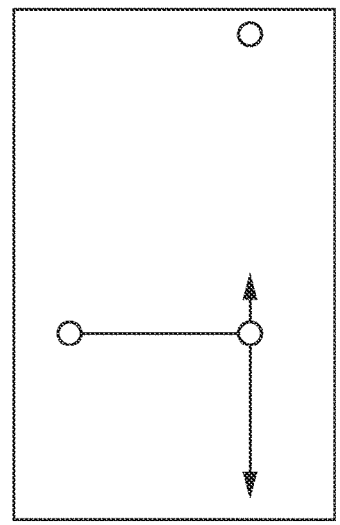
FIG. 6C

Method
- ○ Basic (Direct Stiffness)   ● Advanced (Co-Rotational)
- ☑ Pre-load Geometric Model (Pretension)
  - ☑ Retension wires after pretension displacement (Requires displacement based wires)
  - Static Wire and Point Load Pre-load Contribution (%)   [5]
- ☑ Update Tensions Based on Displacement for All Components
  - Minimum Displacvement Loading Tension   [50] lbf
- ☑ Do Not Update Tensions When Analyzing Anchors, Guys, Sidewalk Braces and Push Braces
  - ☑ Enable Hybrid Loading
  - Hybrid Loading Shear Zone   [18] "
  - Maximum Hybrid Loading Support Angle   [5] °
  - Minimum Hybrid Loading Tension   [50] lbf

FIG. 6D

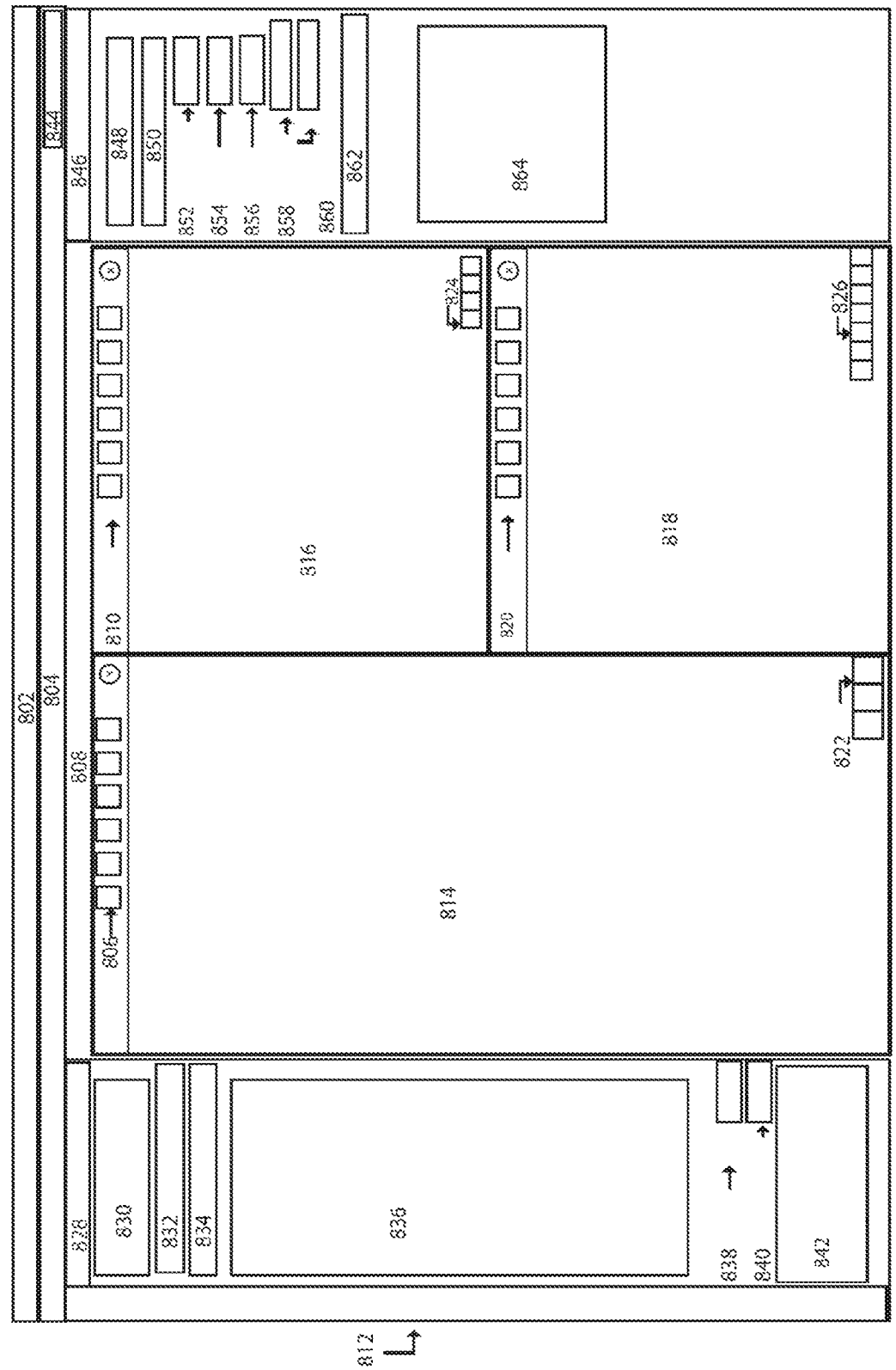

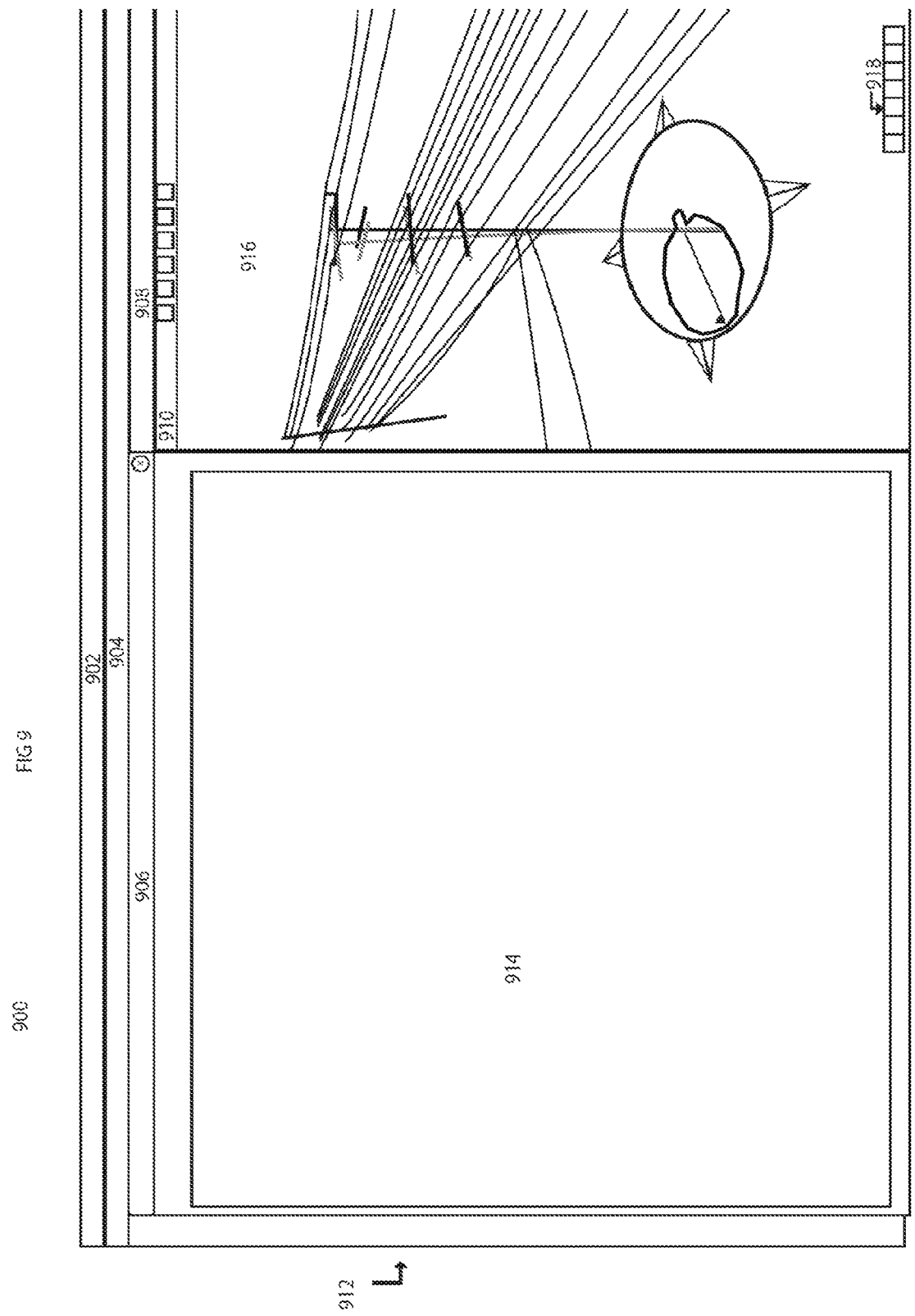

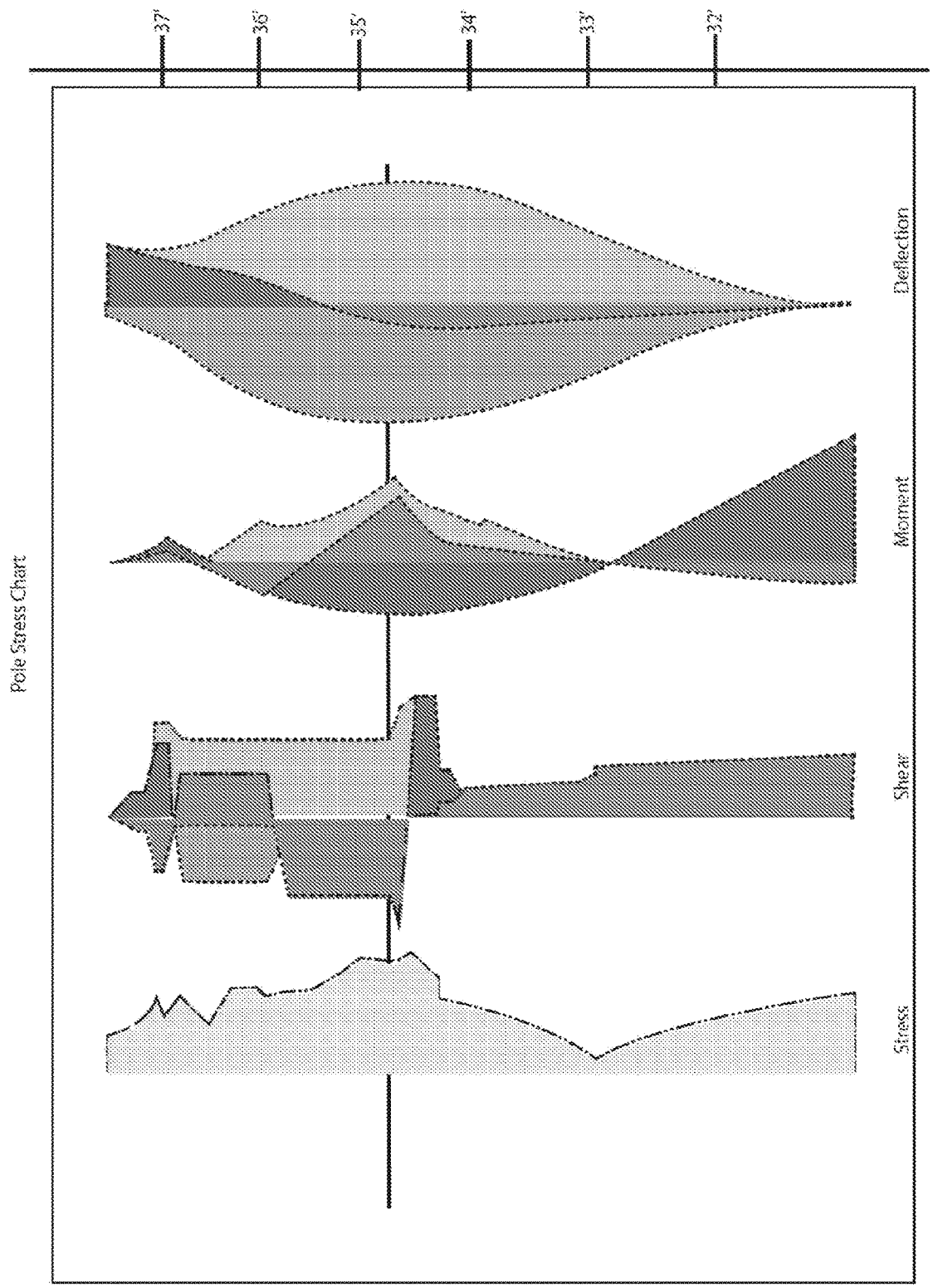

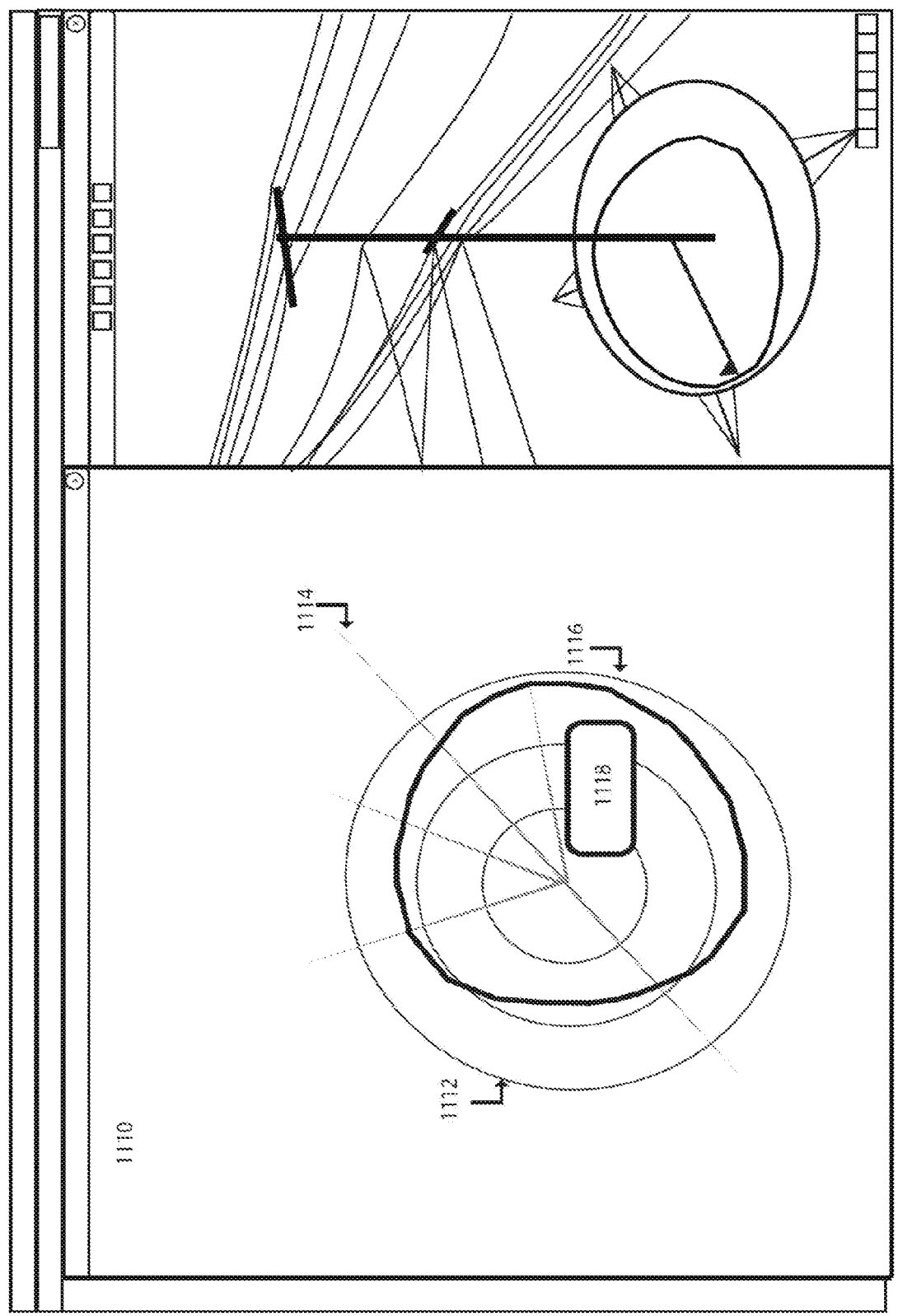

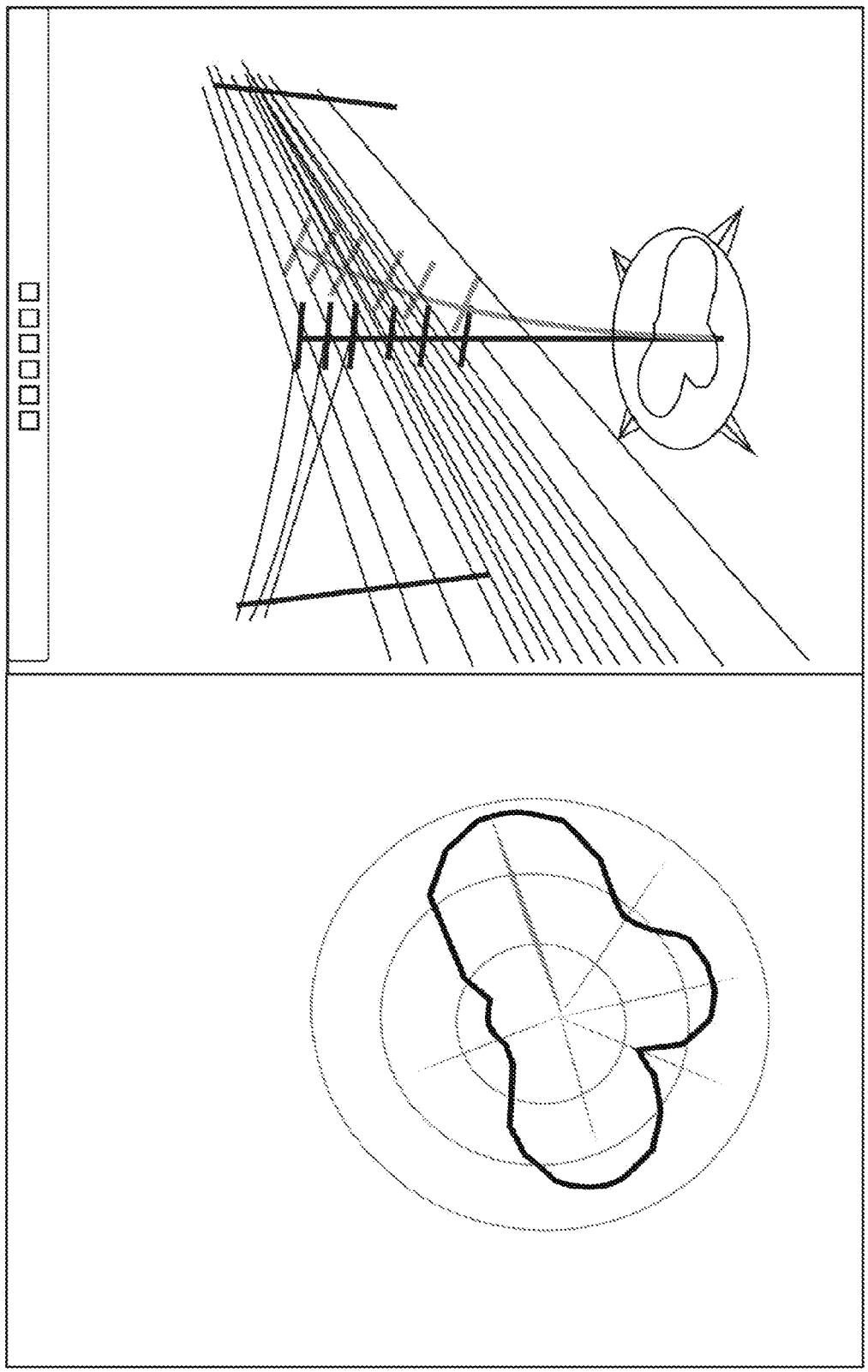

TECHNIQUES FOR UTILITY STRUCTURE MODELING AND SIMULATION

CROSS-REFERENCE TO RELATED APPLICATIONS

The present application is a continuation of U.S. patent application Ser. No. 16/764,745, now U.S. Pat. No. 11,960, 803, by William Schulze et al. for "Utility Structure Modeling and Design", which is a national stage entry of PCT/US2019/019208 filed on Feb. 22, 2019 by William Schulze et al. for "Utility Structure Modeling and Design", which claims the benefit of and priority to U.S. Provisional Patent Application Ser. No. 62/634,532, filed Feb. 23, 2018 by William Schulze et al. for "Utility Structure Modeling and Design," all of which are hereby incorporated herein by reference.

FIELD

This application generally relates to analyzing the design or use of utility structures, and more particularly relates to modeling and solving parameters relating to structures bearing overhead utility assets.

BACKGROUND

Utility companies and their contractors are required and committed to ensuring the safety and reliability of their overhead assets, yet they often struggle to develop consistent processes needed to accomplish these goals. Traditional methods of overhead pole loading are manual, tedious and time-consuming, often involving quite a bit of guesswork. As a result, organizations lose confidence in the integrity of their system, leading to financial misspends, unreliable service, and safety concerns.

Efforts to reduce guesswork through computerized solutions still lack realism and can diverge significantly from actual conditions. More, the computational complexity can cause efforts to analyze groups of utility structures at even modest resolution to be time- or resource-prohibitive. It would therefore be beneficial to provide a more realistic and faster technique for analyzing utility structures bearing overhead assets.

Even where computerized solutions are attempted, data is often discarded or underutilized after being collected through design, analysis, or inspection. The failure to preserve and communicate data, or the need to redevelop previously-developed data, is inefficient, expensive, and time consuming. It would therefore be beneficial to provide systems and methods for persisting information to avoid the need to create such data anew after analyses or inspections.

SUMMARY

Aspects herein relate to systems and methods for modeling and analyzing utility structures or groups of utility structures.

In an embodiment, a system includes one or more interfaces configured to receive inputs describing at least one utility structure and one or more utility components mechanically coupled with the at least one utility structure, environmental conditions to which the at least one utility structure is subjected, engineering standards applicable to the at least one utility structure, and analysis configuration. The system also includes a model engine configured to calculate an acceptable loading of the at least one utility structure based on the inputs describing the at least one utility structure, the engineering standards applicable to the at least one utility structure, and the analysis configuration. The model engine is configured to calculate an expected loading of the at least one utility structure based on the inputs describing the at least one utility structure, the one or more utility components mechanically coupled with the at least one utility structure, the environmental conditions to which the at least one utility structure is subjected, and the analysis configuration. In addition, the model engine is configured to compare the expected loading to the acceptable loading and provide loading results based on at least the expected loading and comparison of the expected loading to the acceptable loading. The system can also include an input module configured to provide input related to one or more utility structures, a model engine configured to model the one or more utility structures based on the input, and a user interface configured to provide results from the model.

In an embodiment, a method includes receiving inputs describing at least one utility structure and one or more utility components mechanically coupled with the at least one utility structure, environmental conditions to which the at least one utility structure is subjected, engineering standards applicable to the at least one utility structure, and analysis configuration. The method also includes calculating an acceptable loading of the at least one utility structure based on the inputs describing the at least one utility structure, the engineering standards applicable to the at least one utility structure, and the analysis configuration. The method also includes calculating an expected loading of the at least one utility structure based on the inputs describing the at least one utility structure, the one or more utility components mechanically coupled with the at least one utility structure, the environmental conditions to which the at least one utility structure is subjected, and the analysis configuration. The method also includes comparing the expected loading to the acceptable loading and provide loading results based on at least the expected loading and comparison of the expected loading to the acceptable loading.

Aspects herein can leverage proprietary modeling and analysis techniques. Aspects herein can provide results in a variety of textual and graphical manners.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 6A, 6B, 6C, and 6D depict example uses and interfaces for analysis disclosed herein.
FIG. 8 depicts an example interface disclosed herein.
FIG. 9 depicts an example interface disclosed herein.
FIG. 10B depicts interface aspects disclosed herein.

FIGS. 11A, 11B, and 11C depict example interfaces disclosed herein.

DETAILED DESCRIPTION OF ILLUSTRATIVE EMBODIMENTS

Disclosed herein are techniques for modeling and analyzing one or more utility structures, independently or among a group of utility structures, efficiently and accurately. By utilizing hybrid loading techniques and proprietary analysis techniques, true-to-life models and mechanics values can be provided for more accurate assessment. By utilizing remote or cloud enterprise processing, complex results can be provided in a timely and efficient fashion. By saving data from models, resources can be preserved later. By providing detailed, rich interfaces (in combination with detailed numeric and textual results), users can most effectively build accurate models and appreciate and interpret the resultant mechanics of those models when loaded. Other aspects will be appreciated on review of the disclosures herein.

Figure 1:
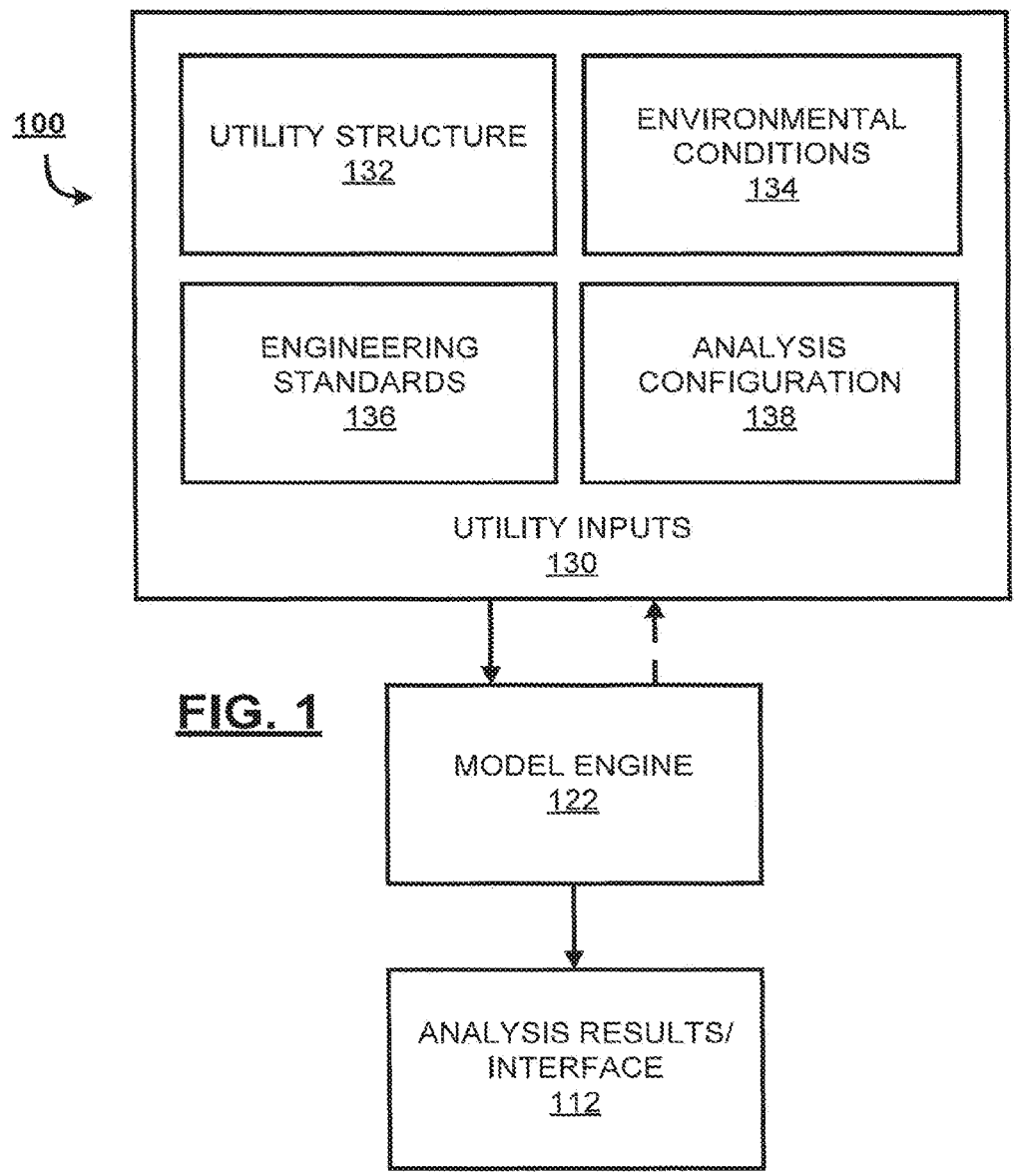
FIG. 1 depicts an example system disclosed herein.

FIG. 1 illustrates an example model system 100. Model system 100 utilizes model engine 122 to analyze a utility structure (represented by data related to utility structure 132) based on utility inputs 130. Model system 100 interprets a specification of a utility structure 132 for analysis in terms, e.g., its material properties and geometry. A loading analysis is specified based on a combination of environmental conditions 134, engineering standards 136, and analysis configurations 138. These values may be provided through, e.g., interface 112 or other interfaces. As used herein, an interface can be any component for receiving information, and can include graphical user interfaces, Application Programming Interfaces (APIs), sensor interfaces, interfaces to databases or other information sources, et cetera. Data provided through interface 112 (or other interfaces) can be manually entered, automatically populated, provided in standardized data formats, et cetera. In embodiments, one or both of the parameters for utility structure 132 and environmental conditions 134 can be sensed or detected based on sensor input (e.g., imaging equipment, weather sensors, other hardware sensor, et cetera). In embodiments, one or both of parameters for engineering standards 136 or analysis configuration 138 can be sourced from a third-party database, which may vary based on geography or other parameters. In embodiments, analysis configuration 138 can be provided or defined based on templates or standard settings.

In embodiments, parameters for engineering standards 136 can include guidelines or legal requirements published by standards groups, such as the NESC (National Electrical Safety Code), CSA (Canadian Standards Association), or GO95 (General Order 95) from the California Public Utilities Commission, as well as internal standards set by a utility company's engineering department. Parameters for engineering standards 136 may include manufacturer material rated capacities (e.g., maximum allowable stress, maximum allowable moment). They also may specify additional multipliers for certain types of load—for example, requiring that all wind loads be increased for higher impact utility structures, such as those crossing a highway.

Parameters for analysis configuration 138 determine simulation-specific parameters for the model engine, including but not limited how wire elements are modeled (e.g., as point forces, as model elements, or as a combination of the two in hybrid loading), whether a linear or geometric non-linear analysis method is used, and whether to apply individual stages of analysis (e.g., pre-tensioning guys, re-tensioning wires).

As used herein, descriptions of "linear" analysis are used to describe a finite element technique analysis that assumes a linear relationship between load applied to the system and displacement, with no changes in element stiffness due to that displacement. In contrast, descriptions of "geometric nonlinear" analysis as disclosed herein are used to describe a finite element technique that accounts for the change in the stiffness of the model as it is displaces under load. More specifically, the stiffness of a utility pole is affected by the deflection induced in the pole by the weight and tension of the overhead elements it supports. Resulting effects can include but is not limited to, by way of example, situations in which strain and displacement are not linearly related, and changes in stiffness due to the changes in the geometry of the structure.

"Geometry" as discussed herein can be referenced in a variety of contexts. Generally, the geometry of a structure details the shape, orientation, et cetera, of the structure and attachments thereto, which can be input or discerned. In the context of geometric nonlinear analysis, geometry can still refer to the structure's shape, orientation, et cetera, but includes the effects of loading such as deflection and other irregular geometries.

At least parameters for analysis configuration 138 and utility structure 132 are sent to a model engine 122, which may reside on the local computer system or on a distributed cloud system. Model engine 122 constructs a finite element model of the utility structure based on, e.g., material properties, geometry, and/or other characteristics of the utility structure described in utility structure 132, as well as analysis configuration 138. Once the structure is modeled, model engine 122 applies parameters for environmental conditions 134 and engineering standards 136. Model engine 122 can in this manner determine the simulated design state of a model of a utility structure (or groups of utility structures) and report on the results of its loading, such as the expected stress or moment on the structure components in that state. The results of this analysis can be saved, either locally or on a cloud server, and can be used to generate an interactive report of the state of the utility structure associated with the model. The results can include pass/fail status of the components in the utility structure based on engineering standards 136.

Examples of parameters for utility structure 132 include, but are not limited to, information on its geometry and material. Geometry can be described in terms of, for examples involving utility poles, diameter(s), total length(s), length(s) above or below ground, et cetera. For other structures, geometry can be described in terms of, for examples involving more complex construction such as multi-part towers, the sizes and orientations of members for lattices or trusses. Material for poles can include, but is not limited to, specific types and qualities of wood or any other material described herein. Example materials for towers can include standard or custom members and the woods, metals, plastics, concrete, et cetera, from which the members are constructed. Geometry can also include the position and orientation of connections or contact points between a utility structure and elements interacting therewith. Elements interacting therewith can include, but are not limited to, support elements (e.g., guy wires, above ground or underground anchors), assets (e.g., transformers, circuit breakers, switches, surge arrestors, fuses, junctions, meters, wireless communication elements), wires (e.g., primary power transmission, secondary power transmission, data transmission, telephone transmission, cable transmission, ground, neutral, service drop), assemblies (e.g., risers, connectors, weatherheads, crossarms, conduits, steps, guards, insulator elements, stirrups, strain insulators, racks, moulding), et cetera. The group of elements including support elements, assets, wires, and assemblies can be collectively referred to as "utility components" herein. Further, the connections and forces or loads imposed by interconnected structures and assemblies are identified and provided (e.g., adjacent poles and the supports or wires shared there between). The geometry and materials of the described utility structure can be graphically rendered on interface 112 in a three-dimensional image allowing real-time adjustment of the utility structure model. They can also be presented in a tabular form, which may be editable, using interface 112 or other display and editing components.

Additional information provided to model engine 122 includes, but is not limited to, parameters for environmental conditions 134. This can include the ground or soil composition (and/or how it varies over the depth of the utility structure), weather information, et cetera. Weather information can include but is not limited to wind direction and magnitude, temperature, precipitation (including ice or snow buildup), et cetera.

Wind force is a significant source of load on utility structures. For complicated utility structures, the direction of wind force that induces the highest stress on the structure may be difficult to resolve. One cannot simply assume use of the direction of greatest wind force because, depending on the geometry of the structure and loads from other sources, the wind force may counteract other imbalanced loads or be itself counteracted by supporting elements (such as guying or push braces). For this reason, the techniques herein can employ a configurable wind sweep that calculates a final stable state of the finite element model with wind load applied from each selected compass direction. This can resolve separate states, or a continuous unified state, up to and including all 360 degrees. The state that induces the worst pass/fail ratio of the analyzed component is reported as the final pass/fail status of that component. The wind direction that induces the worst pass/fail state may also be different for each component that is analyzed.

In additional to calculating the worst case wind direction, model engine 122 preserves the calculated pass/fail ratios and loading values for all directions in the wind sweep. This information is presented in the form of a radial graph, in either two or three dimensions. Each point on the graph is defined in polar coordinates by the compass direction of the applied wind load and the final pass/fail ratio of the component. The points are color-coded to indicate failing, passing, or near-failing status. The value of the stress, force, or moment used to calculate the pass/fail ratio is also shown in text on the graph. This visual representation provides a clearer picture of how the structure reacts to additional wind loading from each analyzed direction, not just the worst-case direction. This information can be used to inform design improvements, such as the decision to reinforce a utility structure design with a stronger pole (increasing capacity in all directions) versus adding additional guying to provide support in a single direction. Example graphs in FIGS. 9, 10, 10B, 11A, 11B, and 11C show some of the variation in loading that may be revealed through the wind graphs.

Analysis results provided through interface 112 (or other components) are reported for all specified wind directions and can be presented in tabular, two-dimensional graphical, and/or three-dimensional graphical formats. Results can flag instances where loads exceed force-to-strength standards (e.g., based on color coding, highlighting, pop-up warnings, signals to draw attention to particular aspects, et cetera). Based on these results, the design of the utility structure may be modified, and the process iterated until all components meet required engineering standards.

Figure 2:
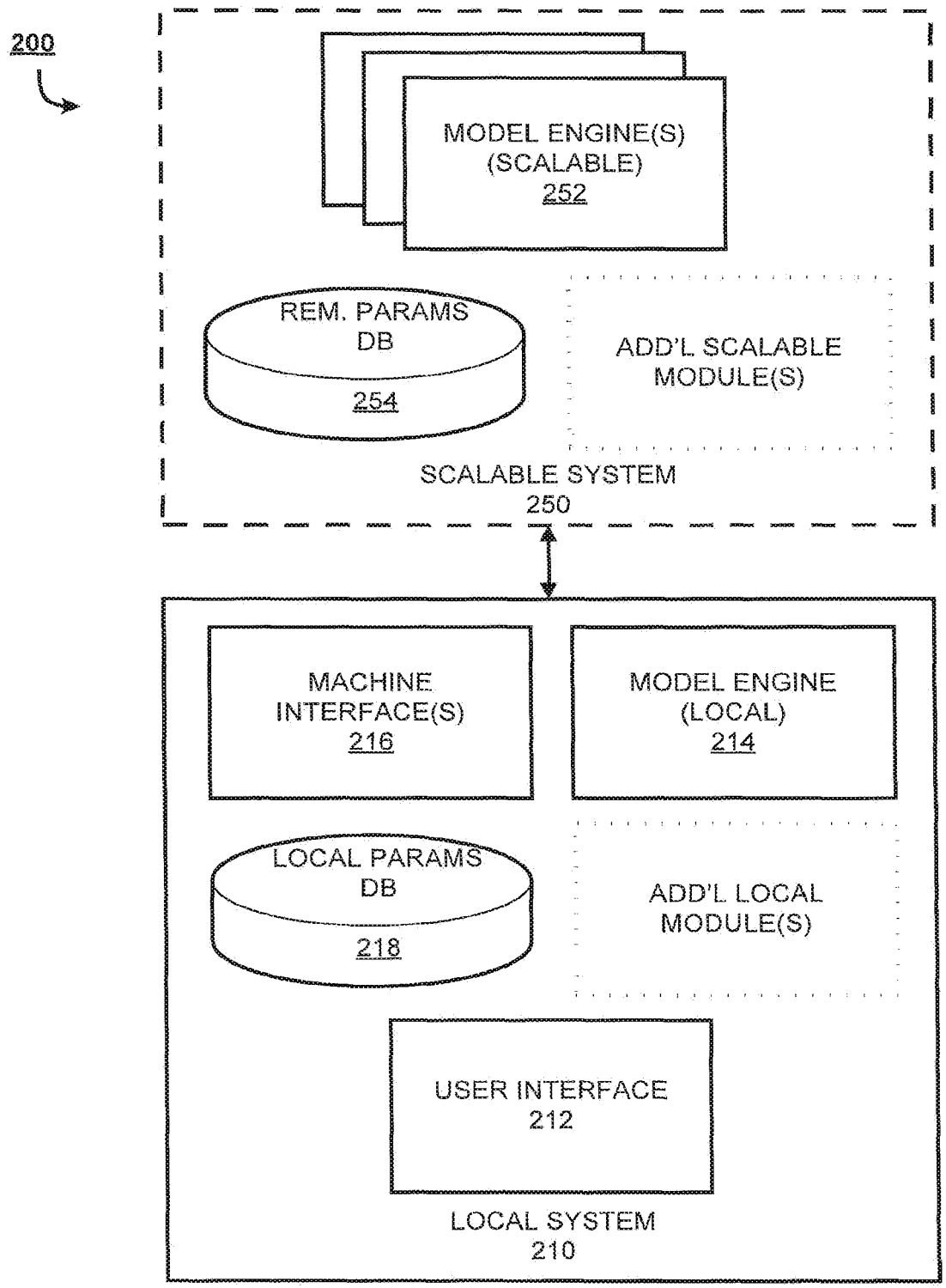
FIG. 2 depicts an example system disclosed herein.

FIG. 2 illustrates an embodiment of a system 200 for modeling utility structures. System 200 includes local system 210 and scalable system 250. Local system 210 includes user interface 202, model engine 204, machine interface(s) 206, and local parameters database 208. Local system 210 can also, in embodiments, include additional local modules for performing other aspects described herein. Scalable system 250 includes one or more model engines 252. Scalable system 250 can also include, in various embodiments, a remote parameters database 254 and additional remote or scalable modules for performing other aspects described herein. While scalable system 250 is illustrated as one scalable system containing multiple engines and a database, it is understood the components illustrated, and others, can be distributed on two or more physical or logical systems without departing from the scope or spirit of the disclosure.

System 200 creates and solves models for utility structures using finite element analysis and other techniques provided herein. Due to the computational complexity of finding loading results (e.g., comparison of actual or calculated loading against rating of structure, assessment of structural integrity when subjected to various loads, et cetera) for even a single structure, machines can require substantial lengths of time to find results. This is compounded where multiple structures are grouped for analysis. To mitigate this issue, local system 210 can offload analysis or rendering tasks to scalable system 250, or share processing load therewith.

Based on the complexity of the model (e.g., number of structures, geometry of structures, number of assets or assemblies, et cetera) model engine(s) 252 can be shared among multiple users, or "spun up" and "spun down" as needed, to provide more rapid analysis. In embodiments, whole scalable systems 250, including one or more model engine(s) 252, can be shared, spun up, or spun down using local or remote servers and/or cloud computing.

Model parameters can be defined using user interface 202. In embodiments, particular information for models can be sourced from local parameters database 208. Alternatively or complementarily, local system 210 can communicate with scalable system 250 (or other remote systems) to access remote parameters database 254 to define parameters and constraints for one or more utility structure models.

As a model is built, or when a request is submitted to analyze model loading and solve the model according to loadings and parameters, local system 210 can communicate with scalable system 250 using machine interfaces 206. One or more of model engine 204 and/or model engine(s) 252 can determine an estimated time (or resource consumption) for completion using local system 210. If the analysis is expected to exceed a threshold, or if the analysis is indicated priority or indicated for expediting, some or all of the data for analysis can be sent to scalable system 250 where one or more model engine(s) 252 perform the computational work to complete the analysis. The work can be queued, balanced, and/or prioritized to ensure appropriate resources are committed and users receive remote resources according to appropriate priority (e.g., first-in-first-out, service level agreements, pay-for-priority, et cetera).

Model engine(s) 252 can perform portions or all of processes including, but not limited to, finite element analysis (which can include hybrid loading and non-linear analysis as described herein), graphic generation or rendering, or other processes.

When the one or more portions are complete, scalable system 250 can merge or reconcile data from multiple (scalable) model engines 252 (e.g., to fix any inconsistencies among grouped or interacting structures or attachments based on the scheme for dividing work) then provide the resultant solutions to local system 210 via machine interface(s) 206 for use. Alternatively, piecemeal results can be provided to local system 210 to provide for local assembly of the final composite solution. The solution can be displayed, graphically and/or in a tabulated manner, using user interface 202.

After solving, model parameters and solutions can be stored in one or more of local parameters database 208 and/or remote parameters database 254. This data can be re-loaded for subsequent review, modified with analyses updating previous solutions for modifications (rather than solving the entire model anew), and/or archived for future use or comparison.

Figure 3:
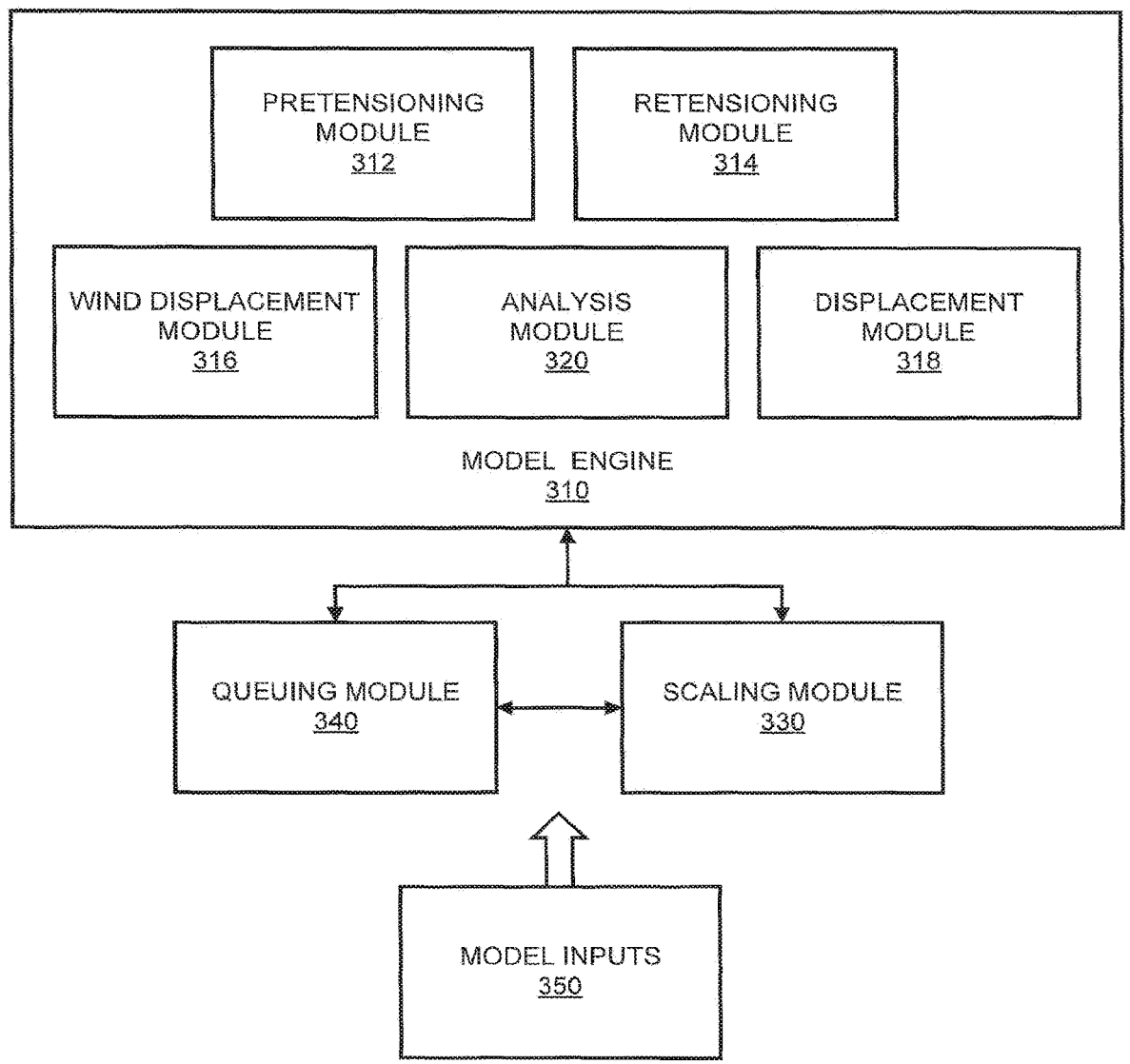
FIG. 3 depicts an example system disclosed herein.

FIG. 3 illustrates an example system 300 including model engine 310.

Model engine 310 includes pre-tensioning model 312, re-tensioning module 314, wind displacement module 316, displacement module 318, and analysis module 320. Model engine 310 can optionally include other modules to perform aspects described herein. System 300 also includes queuing module 340 and scaling module 330, as well as model inputs 350 (received via, e.g., interfaces). While these modules are shown independently or as components of system 300, these modules are illustrated as such for ease of explanation, they may be implemented differently than depicted without departing from the scope or spirit of the disclosure. For example, queuing module 340 and scaling module 330 can be included in a local or remote system separate from system 300. While model engine 310 is illustrated as a single model engine, it is understood that references to a single model engine can, in cloud-implemented embodiments, refer to multiple model engines instantiated using one or more computing devices, and/or a single model engine or modeling task can be instantiated across multiple sources of resources.

Model inputs 350 are provided for modeling. Based on the type of inputs, amount of inputs, or estimated complexity of the inputs—which can be determined while the inputs are provided or after calculations begin—modeling and/or analysis may be distributed between a group of model engines (e.g., a Calc (Cloud) Enterprise Engine or CEE). Distribution can be determined using, e.g., queuing module 340 and scaling module 330. Queuing module 340 can prioritize and balance work performed by one or more model engines including model engine 310. For such prioritization and balance, a scaler (within queuing module 340, within scaling module 330, other modules, a function implemented as a combination thereof) combines multiple weighted variables about the analysis job into a single time estimate. Some variables, which may be primary or controlling or in alternative embodiments influential but not dispositive, include the type of the analysis (linear or non-linear), the number of wind directions to analyze, and various metrics of the complexity of the structure (e.g., the number of wires or the height of the pole). The specific variables and weights are chosen by feeding historical analysis data into a standard machine-learning tool. These weights are regularly re-calculated with new data to bring them in line with current usage and underlying machine and engine performance.

Scaling module 330 can scale up or down resources available for modeling and analysis using cloud computing to "spin up" (create new), "spin down" (remove excess), or reallocate model engines in a given bank of resources. The bank of resources available can be fixed or dynamic depending on the implementation. Further details on these aspects are described elsewhere herein.

These resources can be used to perform pre-tensioning (with, e.g., pre-tensioning module 312) and re-tensioning (with, e.g., re-tensioning module 314) analyses, as well as wind-independent displacement (with, e.g., displacement module 318) and wind-dependent displacement (with, e.g., wind displacement module 316) analyses, as is calculated and compiled by analysis module 320. System 300 can perform various aspects described herein with respect to other systems and methods, and at least partially illustrates queuing and scaling in conjunction with such aspects.

Figure 4:
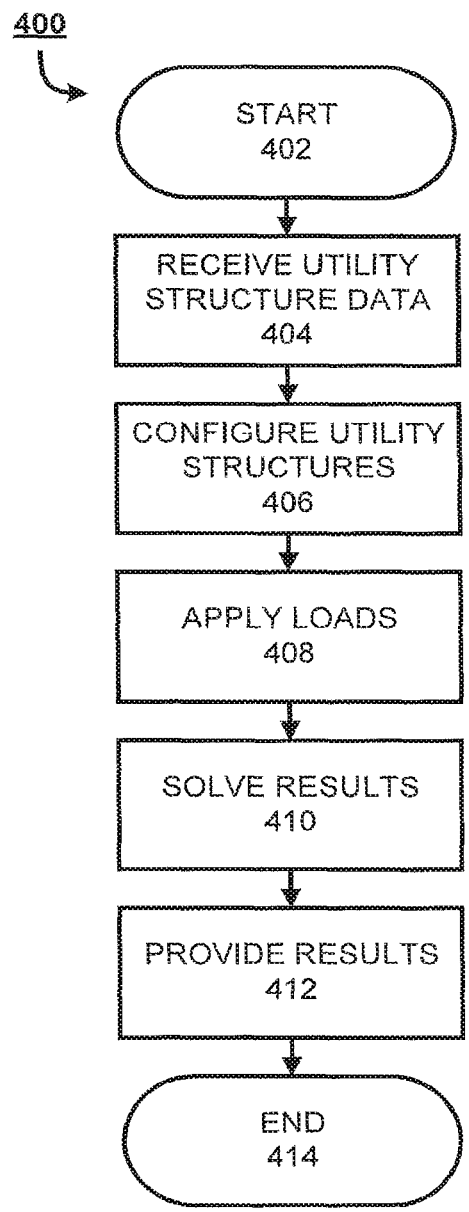
FIG. 4 depicts an example method disclosed herein.

FIG. 4 illustrates a methodology 400 disclosed herein for solving structural analysis on utility structures. Methodology 400 begins at 402 and proceeds to 404 where utility structure data is received. Based on the data the utility structures are configured at 406 to represent their real-world configuration and dependencies by way of mechanical coupling among groups of structures. Static (e.g., assets) and dynamic (e.g., wind) loads are then applied to the structure at 408 and results are solved (e.g., structure mechanics) at 410. The results are provided at 412 and methodology ends at 414. Further details on these aspects are described elsewhere herein.

Figure 5A:
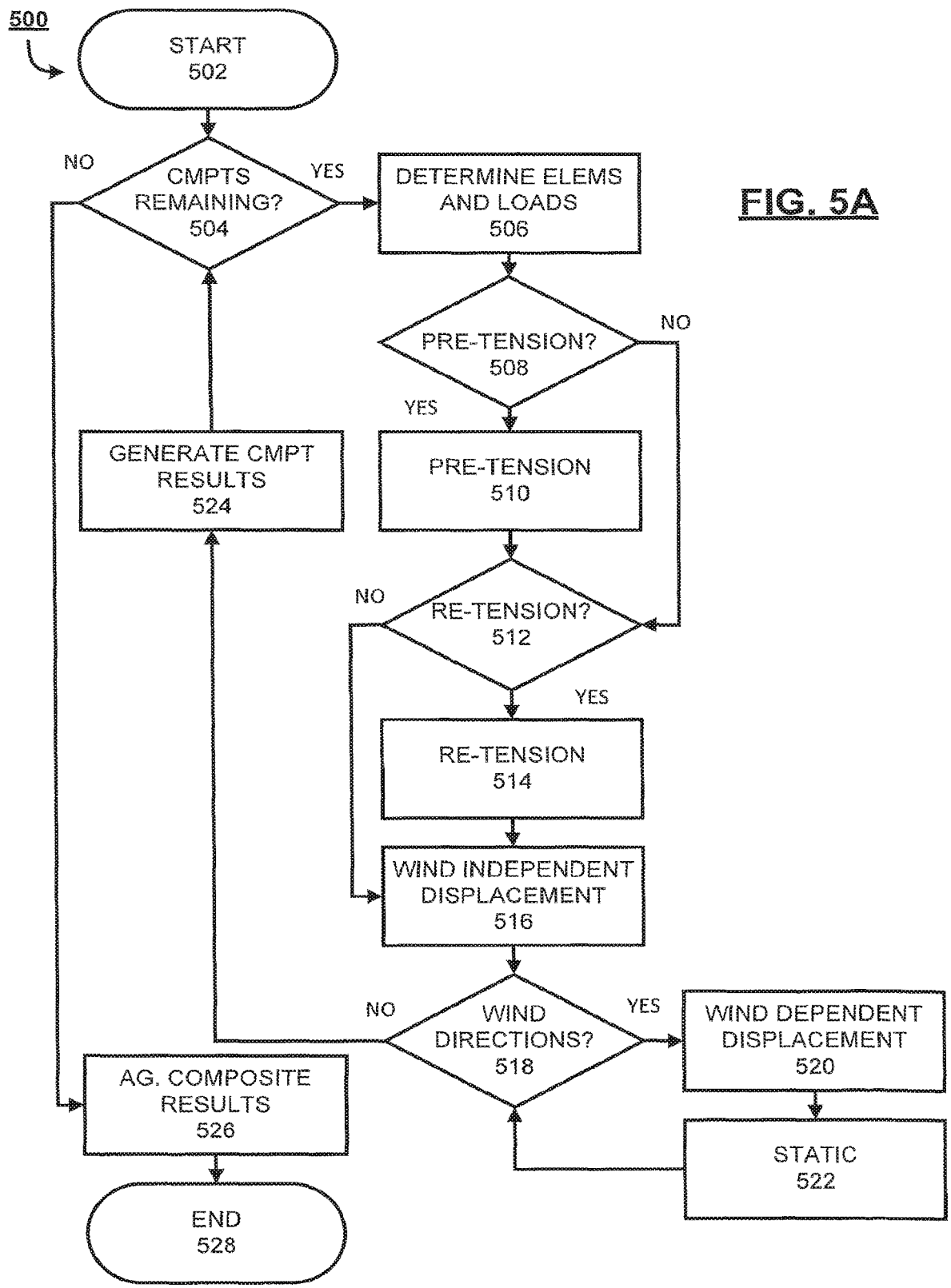
FIGS. 5A and 5B depict an example method for non-linear or hybrid analysis disclosed herein.
Figure 5B:
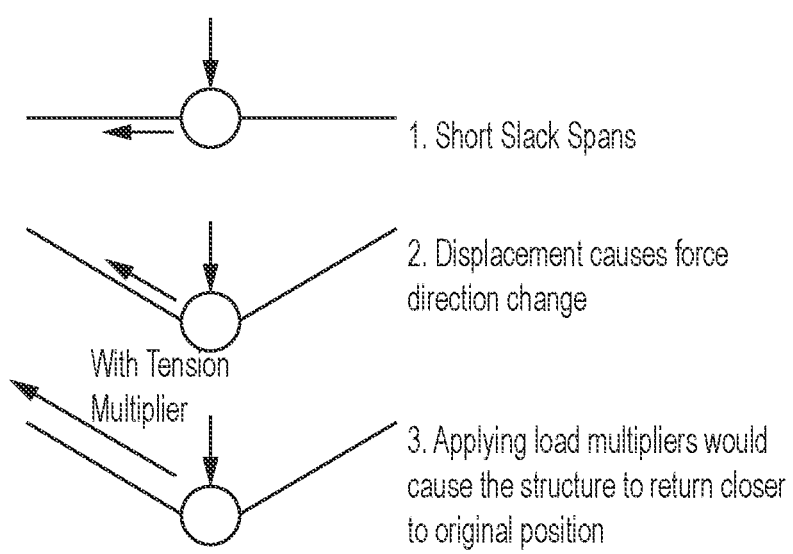

FIGS. 5A and 5B illustrate a technique disclosed herein that can, in embodiments, define the function of a model engine. Particularly, FIG. 5A describes methodology 500 for performing a loading analysis on a utility structure. The loading analysis can be specified by one or more of, e.g., a utility structure, environmental conditions (including but not limited to wind, ice accumulation, and other factors), engineering standards, and analysis configuration. Finite element analysis types that can be utilized in these and other aspects include but are not limited to linear or geometric non-linear analysis (or analyses). Geometric non-linear analysis accounts for the nonlinear affects of changes in the geometry of the structure, such as deflections or deformations, as they occur. The geometric non-linear analysis method of this disclosure accounts for possible instabilities and changes in load locations or directions as the structure displaces under load.

Methodology 500 begins at 502 and proceeds to 504 where a determination is made as to whether model components remain to be added, loaded, or solved (which can be completed independently before combining the components and their effects in a composite model). In this manner, methodology 500 can proceed in an iterative manner, analyzing components until all are properly included in the model.

The model engine first determines if multiple separate models and analyses are required, which can be determined in conjunction with assessing whether the model analysis requires further components to be added, loaded, or solved at 504. For example, the engineering standards may specify different load multipliers based on material type, requiring a steel guying component to be modeled differently from a wood pole component. This may or may not instruct multiple independent simulations in the model engine. Each individual simulation then proceeds through a series of phases. The utility structure is used to generate a finite model to be analyzed. The phases depend on analysis simulation configuration. In embodiments, each phase involves at least one component identified in the determination at 504 and the subsequent determination of element(s) and load(s) at 506. Each component identified at 504 will undergo the subsequent analyses illustrated, including a determination of how to model the structure (506), a determination of wind-independent displacement (516), wind dependent displacement (520), static (522), and component result generation (524). In embodiments, the methodology 500 can fail if certain parameters are not provided (e.g., at least one wind direction, at least one component, combinations thereof).

Each phase solves a specific engineering simulation problem, and the output of each phase is passed along to the initial state of the next. Each phase may be configured or disabled separately through the analysis simulation configuration. At each phase, new forces are incrementally introduced to the model, and then the finite model is iterated to a steady state. If a stable state is not achievable with the given inputs, the analysis is reported as non-convergent and unstable. Single component's effects are resolved at the static result (522) and the resulting state of the system for that component is saved for combination into the larger system comprising all components. (Such component analysis can be undertaken independently.) After the final phase of analysis for each component at 522, the finite model is in a state representing the effect of the loading analysis conditions on the specified structure with all sub-analyses/phases combined at 524. The stresses, moments, and forces on the model are compared to the allowable values specified for the component, and the model engine generates a result that includes a description of the resulting state of the simulated components as well as its pass/fail status. When the result for the final component in 504 has been generated, the component results are aggregated into a report describing the pass/fail status of the structure and its components.

At each phase of the loading (or cycle of methodology 500), a decision is made on how to model wires. Depending on configuration, individual wires may be modeled as constant forces representing their loads on the utility structure, or as full finite model elements. Traditionally this decision has been a global analysis configuration, but hybrid loading allows more accurate modeling of some designs by choosing which wires are modeled as constant force loads and which are modeled as elements based on utility structure geometry.

Discussing methodology 500 in its entirety, the methodology begins at 502 and proceeds to 504 where a determination is made as to whether components remain for which results have not been generated. If so, methodology proceeds to 506 where the elements and loads are determined. At 508, a determination is made as to whether pre-tensioning analysis will be performed. If the determination at 508 returns negative, methodology 500 can proceed to 512. If specified (e.g., the determination returns positive), modeling proceeds to pre-tensioning at 510. Pre-tensioning is a method of setting the initial tension on guy elements to simulate the load they are supporting at structure installation. When overhead wires are installed, the dead-end pole is first guyed. The guys are then tensioned, which causes the pole to deflect toward the guys. At this point, the wires are tensioned, pulling the pole back to a vertical position with nominally-zero deflection and all horizontal loads being supported by the guys. In a finite element model, if the guy elements are initially modeled as having zero tension, the load from the wires will cause the pole to deflect before the guys' reactions balance the load, leading to increased reported loading on the pole and decreased reported loading on the guys compared to field conditions. A solution to this problem is to allow the user to specify a constant pre-tension for guys. This solution, however, makes numerous assumptions about the geometry of the structure and how the reaction force is allocated between multiple guys. The model engine instead simulates wire installation procedures by applying the wire loads at installation temperature and tension, iterating to a stable deflected state of the system, then incrementally increasing the tension applied in the guying elements until the pole elements are returned to a vertical position.

At 512, a determination can be made as to whether re-tensioning is to be performed in the analysis. If the determination at 512 returns negative, methodology 500 can proceed to 516. If a wire re-tensioning phase is specified (e.g., determination at 512 returns positive), methodology 500 proceeds to 514 and the wires may be represented in the finite model as simple constant forces equal to their weight and tension under installation conditions. If a wire re-tensioning phase is not specified, wires may be modeled by finite elements. The wire re-tension phase at 514 proceeds as follows: During the pretension phase of analysis some deflection and deformation occurs in the model. If the analysis configuration models wires as finite elements, this initial displacement can change the tensions in those wires that are applied to the structure. In the wire re-tensioning phase, the forces representing wires selected for element modeling are replaced with elements matching the catenary geometry and intentional tension that would induce that force.

If the displacements induced by pre-tensioning (e.g., at 510) or wire re-tensioning (e.g., at 514) phases are too large (e.g., current displacement of any finite nodes is above a threshold value calculated for failure), the phases can be discarded and analysis continues with the initial model state. In utility structures designed to common standards this should not generally happen, but atypical guying angles or tensions can result in directional imbalances between guy reactions and wire loads that prevent the simulation of a realistic initial state through this methodology.

At 516, methodology 500 performs a wind independent displacement phase. During this phase, environmental effects separate from wind (including but not limited to tension changes due to temperature and weight from ice loading) are iteratively added to the model and until the model converges to a stable state with the full loading applied.

The stable geometry determined at 516 is used as the base model for the wind dependent displacement phase when wind directions are present. The wind dependent displacement phase comprises a sub-loop of methodology 500 in which a determination is made as to whether any wind directions remain for testing at 518. If all wind directions are analyzed and the determination at 518 returns negative, methodology 500 recycles to 504, where additional components can be considered if applicable, and results can be generated if no additional components are applicable (e.g., all components determined).

If the methodology at 518 returns positive, the wind directions are iteratively considered for wind dependent displacement. For each wind direction (which can be specified in, e.g., the environmental configuration), wind forces are applied to the model at 52- and a stable geometry is determined before continuing to the load factor application stage. This produces an independent model state for each analyzed wind direction. The wind dependent and wind independent displacement phases may be combined without departing from the scope or spirit of the disclosure.

Once a stable geometry is determined at 520, methodology 500 proceeds to the static phase 522 for the relevant component phase of analysis. Wire elements are replaced with point loads with equivalent force so as to prevent loading factors from reducing load on the utility structure by increasing the supportive tension force of those elements. Load factors are applied to the appropriate forces based on the engineering standards configuration and a stable geometry determined with respect to the component under analysis. This state represents the design condition of the utility structure at that wind direction, given the specified configuration. Other assumptions may be applied without departure from the scope or spirit of the disclosure.

Once a stable geometry is determined at 522, methodology 500 proceeds to 518 to determine whether wind dependent displacement should be conducted for other wind directions (e.g., are any available or possible wind directions remaining as uncalculated). If all directions are complete, the determination at 518 returns negative, and methodology 500 proceeds to 524 where the component results for all wind independent and wind dependent displacement are combined with respect to the component. The component results compare the stresses, forces, moments, and other values found in the final state of the model with the engineering standards allowed. The results can be saved for presentation to the user (using, e.g., interfaces disclosed herein). Loading values and pass/fail status are reported for all wind directions specified in the environmental configuration. Additionally, for the wind direction inducing the worst loading on the component, the final state of the loaded model, including but not limited to displacements, tensions, forces, and moments, is recorded for later display to the user. If no further components remain as determined at 504, methodology 500 proceeds to 526 where the component results are aggregated into a report detailing both the pass/fail status of the individual components and the combined pass/fail status of the utility structure as a whole. After results are aggregated or calculated at 526, methodology 500 can end at 528.

FIGS. 6A, 6B, and 6C illustrate loadings and FIG. 6D illustrates interfaces from systems disclosed herein, particularly in the context of hybrid loading techniques disclosed herein. Such aspects can provide context for hybrid loading as discussed, e.g., in FIGS. 7A and 7B. In certain jurisdictions, as well as according to certain best practices implemented by utilities or businesses, various overhead design codes address the design of support structure strength. These codes broadly state the need to have the support structures capable of handling the entire load they were installed to support. Some implementations can treat the pole as a strut that only supports in the vertical direction, and the support elements providing all transverse strength. While this assumption may be workable in relatively simple or easily-defined situations, it may fail in situations with out of plane forces. The added complexity of changes from displacement-based loading (wires tension updates based on displacement) combined with varying installation procedures and outcomes can render such estimation ineffective and risk structural failure. Loading on the support elements of a structure is in fact a combination of the location of supports, the specific installation procedures, and displacement-based loading effects.

To address this, hybrid loading, a loading method that bridges the gap between constant force loading and displacement-based force loading, is disclosed. This technique holds wires intended to be supported with guying at a constant load while allowing unsupported wires to displace. This combines the stability of displacement loading and the higher, more expected guy wire loading of constant forces. The technique considers that loading can be artificially low due to displacements in the structure and/or that loading, and displacements can be artificially high to maintain design tensions.

FIG. 6A illustrates a simple dead end with lower tension tap. The full tension is running vertically, and an unsupported lower tension conductor is running horizontally. The result of the pole being loaded entirely with displacement-based loading would be that the tensions would quickly decrease, and the final state would be lower than expected loading in the down guy.

FIG. 6B shows a loading type would result in more displacement into the tap span than the actual in field loading situation. In this situation the pole would displace slightly into the tap span, the tension would decrease even further, and the displacement would equalize.

FIG. 6C shows the hybrid loading technique described herein. The high-tension span backed by the down guy is held at the constant force design tension and the slack tap can equalize with displacement. This also includes classifying and grouping conductors by various attributes then applying subsequent techniques based on the identified attributes.

To help account for installation procedures, conductors are associated to their respective support elements. Assuming proper design and construction practices, every support element on the structure is designed to support specific loading inputs on that structure. In an example for particular materials, the American Institute of Timber Construction specifies that the stress in a timber beam within one diameter of the support element is governed by shear stress. This result indicates that anything within that distance is going to be fully supported by that support element. The support provided to loads outside this "shear zone" would be diminishing with increased distance. The US Department of Agriculture's Rural Utilities Service design standards never exceed a specified distance of one foot, six inches from the load to the location of the supporting guy attachment point. The shear zone value is configurable to allow users to set values that fall in line with design standards at their organization. FIG. 6D shows an interface allowing a shear zone option according to these or other rules in hybrid loading.

The wires and supporting elements within a given shear zone can be grouped together into what may be termed a "support group." Support groups can be evaluated to determine how the wires should be modeled to best represent those elements.

Another consideration for hybrid loading techniques is how well constrained the model is at any given support attachment point. If the support elements are at the same angle or very close to the same angle, the structure is relatively free to move laterally from the supports and therefore wire tensions can still equalize. For example, if a value of 5 degrees was chosen to be the limit allowed between support directions, the structure would be considered free to move when support directions were less than 5 degrees. The supportive force proportion at 5 degrees is the sine of this angle, or 0.087, which can limit the amount of movement. Above this threshold the support group is considered "fully supported." As shown in FIG. 6D (e.g., the boxed-in portion, which may not be visible in implemented interfaces), similar to the shear zone, this value is configurable in interfaces for systems and methods disclosed herein to allow for different engineering decisions.

Support elements are placed on poles to back significant loads on the pole. If a very low tension wire is kept constant, it would not displace the structure enough to properly equalize the tensions in the displacement based wires. To account for this and provide that wires of significant load are considered, the tension is compared to a minimum value, and only tensions above that value are considered for the possibility to be held constant. FIG. 6D illustrates such an option in an interface for systems and methods disclosed herein (e.g., the boxed-in portion, which may not be visible in implemented interfaces). The tension threshold value accounts for the variance in different organization's tensions.

After the support groups and the constraints of the model are determined, possible construction types can be analyzed to determine, at least in part, which span is the primary driver of the loading. In construction types where the loads are in a balanced situation, the greatest tension can be selected to be kept constant. If the tensions are equal, then the longest span is chosen because shorter spans equalize with smaller displacements. Choosing spans first based on tension then based on length may be referenced as the "greatest/longest" span. In construction types where the guy is backing a specific span, the span that is closest to being supported is chosen to be kept constant. This type is referenced as the "backing" span.

Based on these techniques, more realistic loading is achieved. While particular assumptions are described, systems and methods herein may permit application of alternative assumptions without departing from the scope or spirit of the disclosure.

Figure 7A:
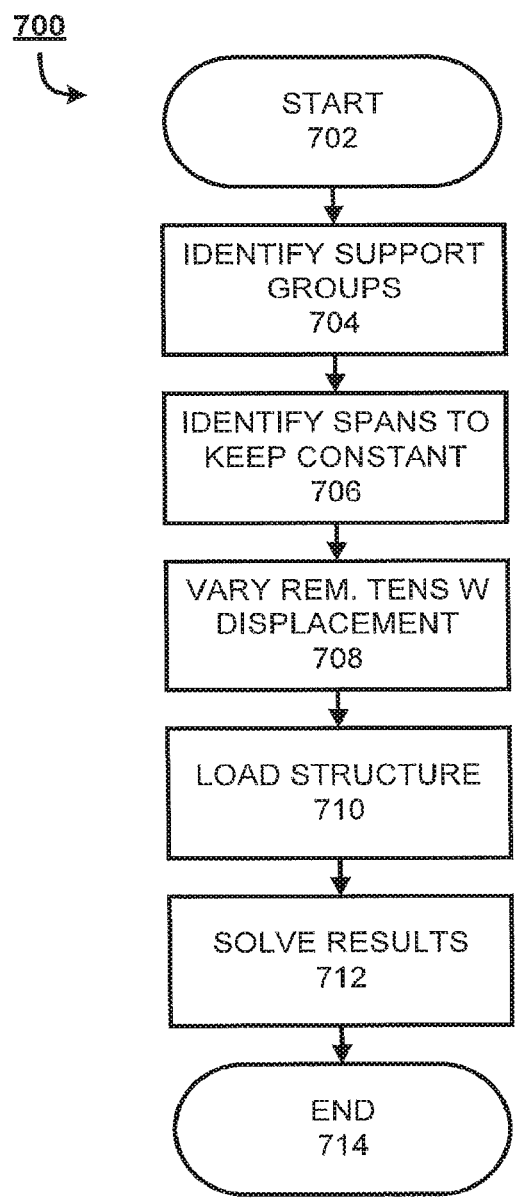
FIGS. 7A and 7B depict additional example methods disclosed herein.
Figure 7B:
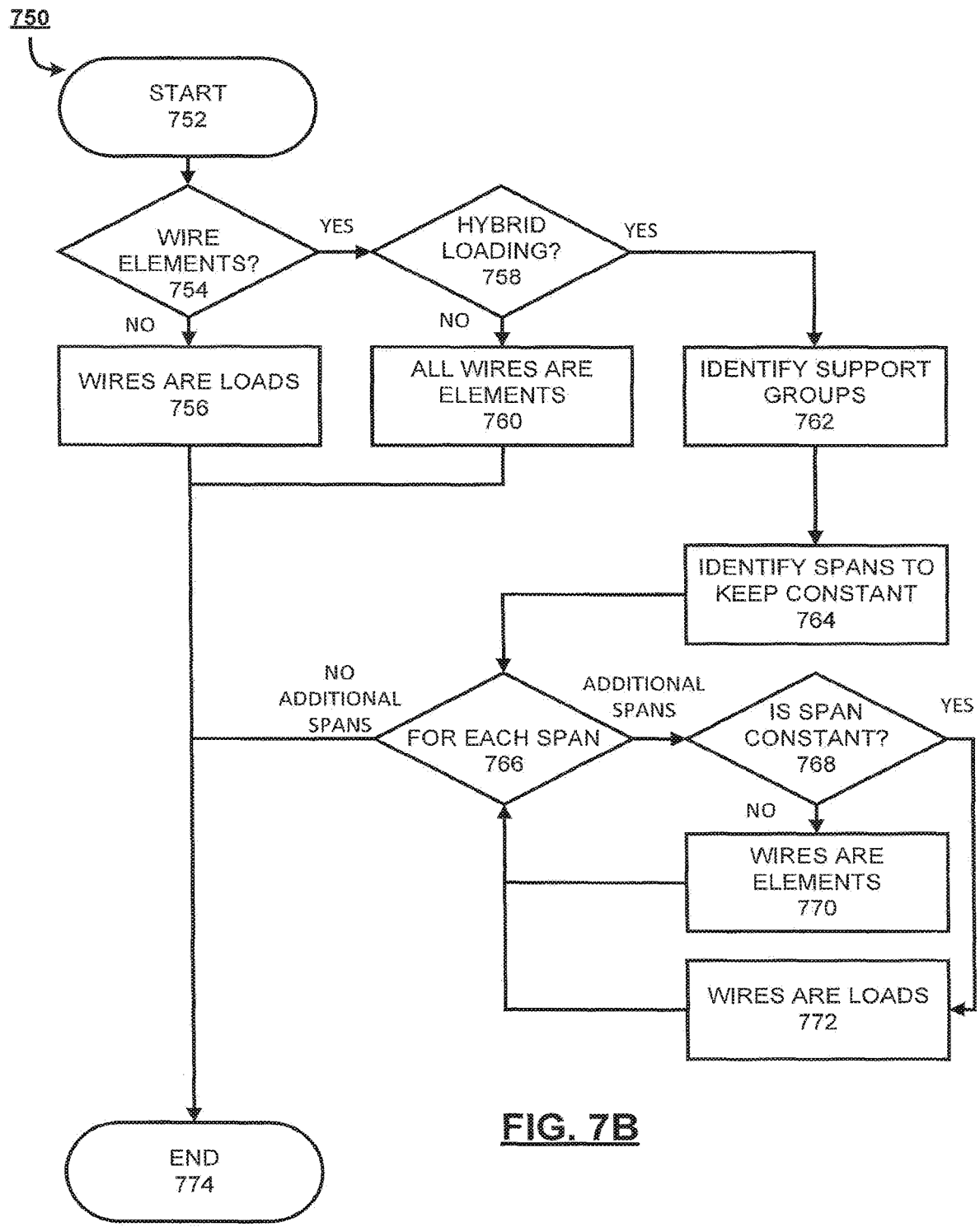

Turning to FIGS. 7A and 7B, these drawings illustrate embodiments of methodologies for performing hybrid loading in analysis of utility structures. As discussed above, hybrid loading techniques may keep loading constant with respect to certain elements but allow loading to adjust with displacement in others.

Focusing on FIG. 7A, methodology 700 begins at 702 and proceeds to 704 where support groups are identified for each element on the structure. Thereafter, at 706, spans with wire tension kept constant are identified. For example, in an embodiment disclosed herein: if there are 2 or more guys, and they are all opposite within the maximum support angle, this presents a "storm guying" situation and the highest/longest span is held constant; if the support group is "fully supported," then all spans are held constant; if there are 2 or fewer spans, then the greatest/longest span is held constant; and if there are 3 or more spans, then the backing span is held constant.

At 708, any remaining wires' tensions allowed to vary with displacement as calculations proceed, and at 710 the structure is loaded to prepare the model to generate results. At 712 results are solved for the model, and methodology 700 ends at 714.

FIG. 7B describes a methodology 750 for wire modeling determination, including hybrid loading. In embodiments, methodology 750 can provide complementary or additional detail regarding other wire modeling describe herein (e.g., 506 in FIG. 5A, which may or may not include hybrid loading). Methodology 750 begins at 752 and proceeds to 754 where a determination is made as to whether wires are configured to be modeled as finite elements at all, or entirely as loads. If no wires are to be modeled as elements, methodology 750 proceeds to 756, indicating that wires are loads, and then ends at 774. If at least some wires are to be modeled as elements (e.g., 754 returns positive), it progresses to 758, where it determines if hybrid loading is configured to be used. If hybrid loading is not enabled, methodology 750 proceeds to 760 indicating all wires are modeled as elements, then proceeds to end at 774. If hybrid loading is enabled (e.g., 758 returns positive), support groups are identified at 762 based on the geometry of the utility structure and the shear zone configuration. The wire spans that are to be kept constant are identified using the techniques and configuration detailed previously based on support group membership and longest span at 764. For all spans at 766, if the spans were identified as being kept constant at 764, they progress to 772 and are modeled as loads. The spans that do not fall under that identification are modeled as finite elements at 772. When all spans have been processed, methodology proceeds to end at 774.

FIG. 8 discloses an example interface 800. Aspects of the interface provide a flexible environment allowing users to tailor the software to their particular preferences. The interface provides the capability to create and edit utility structure designs in three dimensions and using a three dimensional view, and provides drag-and-drop functionality for utility structures and attached assets or support. Both graphics and table views are available for design, analysis, and results. Graphics views support zooming and can integrate photographs in addition to modeled imagery. The interface includes configurable workspaces which can be provided on a single display or extended across multiple displays. A map can be included showing an overhead animated layout of modeled elements or elements influencing a particular modeled element. Various warnings can be indicated at the upper right portion of the interface to increase awareness and opportunity for review.

Interface 800 particularly includes main menu 802, tool bar 804, side dock 812, 3D view pane 814, view icons 806 (for 3D view pane 814), view title 808, photo view pane 816, view icons 810 (for photo view pane 816), map view pane 818, view icons 820 (for map view pane 818), toolsets 822, 824, and 826, components panel 828, components 830, owner dropdown 832, group dropdown 834, components tree 836, quantity 838, vertical spacing 840, quick assembly menu 842, search 844, properties panel 846, owner control 848, size control 850, attach height 852, offset 854, direction 856, association 858, ID 860, attached to 862, and attachments tree 864.

From left to right as illustrated, side dock 812 can include various buttons or icons. Components panel 828 includes a components set 830 which can include, e.g., poles, wires, guyings, assemblies, equipment, points, crossarms, insulators, et cetera. An owner dropdown 832 (e.g., owner can be "Acme Power") and group dropdown 834 (e.g., group can be "Primary") can be arranged thereunder. A component tree 836 can be arranged thereunder, which can include descriptions of materials or components, with variables under the descriptions (e.g., "full" or "slack" tension). Quantity 838 and vertical spacing 840 selections can be provided thereunder. A quick assembly menu 842 can be provided to allow for grouping of, e.g., wires, crossarms, insulators, et cetera. Moving right, 3D view pane 814 shows a 3D view of the utility structure; photo view pane 816 shows a photo view of the utility structure (e.g., from the ground); and map view pane 818 includes an overhead map view of the utility structure. At right, a component properties panel 846 can include an indication of a component (e.g., crossarm), its owner 848, size 850, attachment height 852, offset 854, direction 856, association 858 (e.g., "Next Pole [124', 178°]"), and ID (e.g., "CrossArm #3"). An "Attached To" pane indicates an attachment within component properties panel 846 (e.g., "Pole"), and an attachments tree 864 describes one or more attachments (e.g., crossarms) and icons for new assembly or to remove.

FIG. 9 discloses another example interface 900. The interface shown displays tabulated and graphical results for a utility structure analysis. To expedite production of these results, the interface can be operatively linked to a separate, distributed, and/or shared analysis platform which provides scalable computing resources to expedite complex calculations. Warnings can be shown in the upper right of the interface, as well as at the top of each column in which a generated result includes loads within a threshold of or exceeding the maximum acceptable load (which is calculated based on, e.g., engineering parameters and utility structure parameters including material characteristics.

Example interface 900 includes main menu 902, tool bar 904, results title 906, view title 908, view icons 910, side dock 912, analysis result summary table 914, graphic view 916, and toolset 918. Main menu 902 can include, e.g., menu options for the project, location, design, tools, user preferences, and help. Tool bar 904 can include buttons for various tools. Results title 906 provides a title for the tabulated results described in analysis result summary table 914 (e.g., "Detailed Analysis Results" and a file or project name), and view title 908 provides a title for the graphic view 916 (e.g., "Graphic View" and a file or project name). View icons 910 can provide a series of icons associated with the view portion of interface 900. Side dock 912 includes additional buttons or icons. Analysis result and summary table 914 can provide a list of components and component details corresponding to load levels according to multiple load cases or conditions according to different standards (e.g., CSA Heavy, G095 Light, NESC Medium). Graphic view 916 can show a depiction of a utility structure, wires and utility components attached thereto, deflection or movement of the utility structure, and a radar chart such as those described herein associated with the utility structure based on the loadings. Graphic view 916 can indicate an analysis case associated with one of the multiple standards identified in analysis result and summary table 914, as well as the structure and stress amounts. Toolset 918 can also be provided to show additional icons and/or buttons.

Figure 10A:
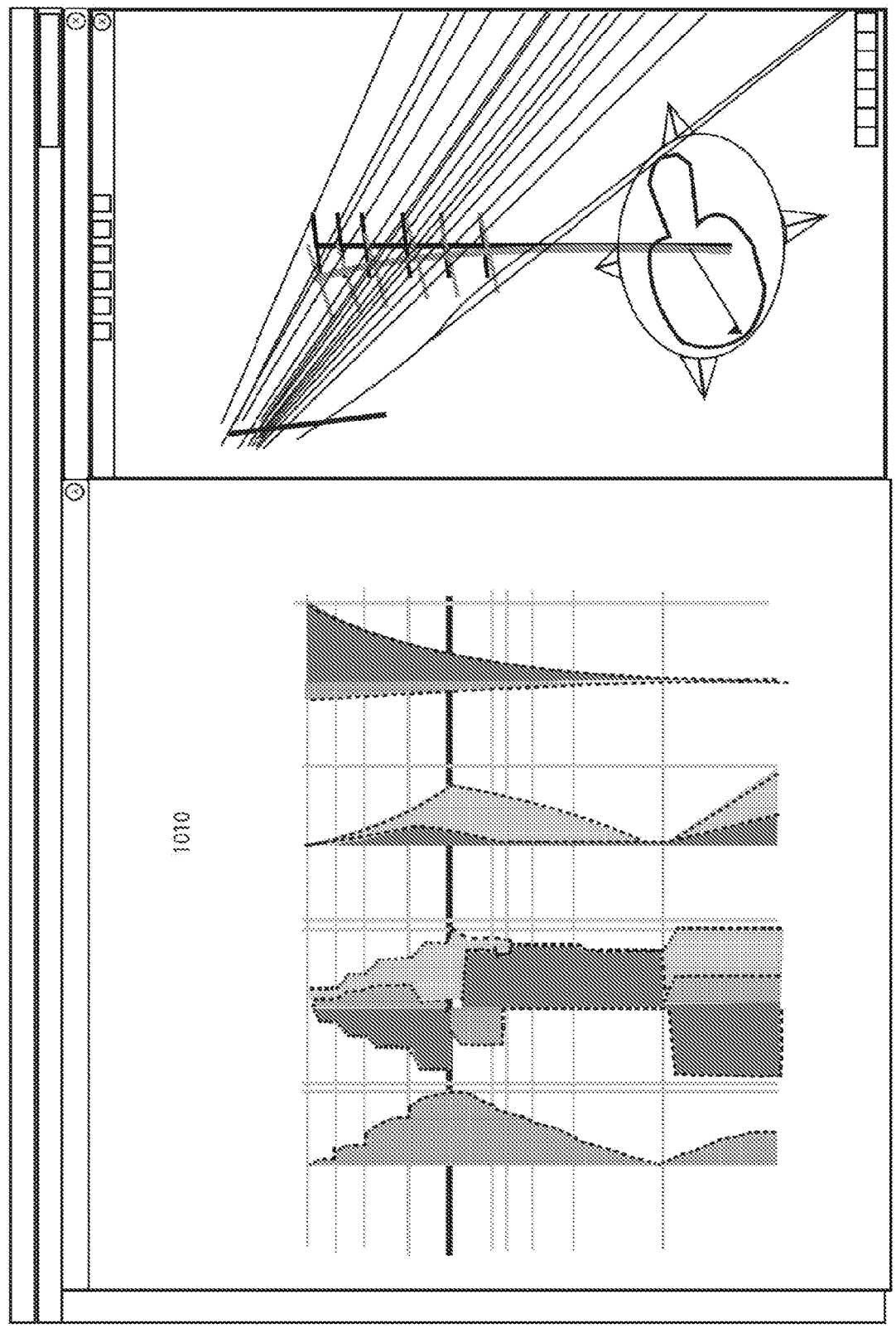
FIG. 10A depicts an example interface disclosed herein.

FIG. 10A illustrates an example interface 1000 disclosed herein depicting an example wind sweep and providing analysis at a variety of points indicative of different wind directions. Pole stress and other warnings are provided at the top of the three dimensional graphic, and a further indicator noting three warnings for review is provided at the upper right of the interface. FIG. 10B provides a more detailed view of the height chart pane from FIG. 10A, which shows, e.g., stress, shear, moment, and deflection at various points along the length of the modeled pole in view of modeled loading. In embodiments, FIG. 10B can depict stress, shear, moment, and deflection of the structure for the worst-case wind direction. The height charts can illustrate the stress, shear, moment, and deflection of the pole at any given height along the structure, as well as any facilities or equipment that is attached at that height. While FIG. 10B shows simplified values and details for purposes of illustration, it is understood that height may be graduated finely (e.g., by inch) and Interface 1000 can have some or all of the elements of interface 900. Interface 1000 as shown can be an alternative view of other interfaces herein, or another interface provided herein using a system or software that provides other interfaces herein. Interface 1000 various information in result pane 1010 as opposed to tabulated results. The various information can include the "height chart" illustrated, depicting the stress levels at various heights of the utility structure. Result pane 1010 can include tabs for other displays, including a summary tab, a forces and reactions tab, a radar chart tab, a detailed inputs tab, and a usage tab (in addition to a height chart tab to select the display provided).

Figure 11C:
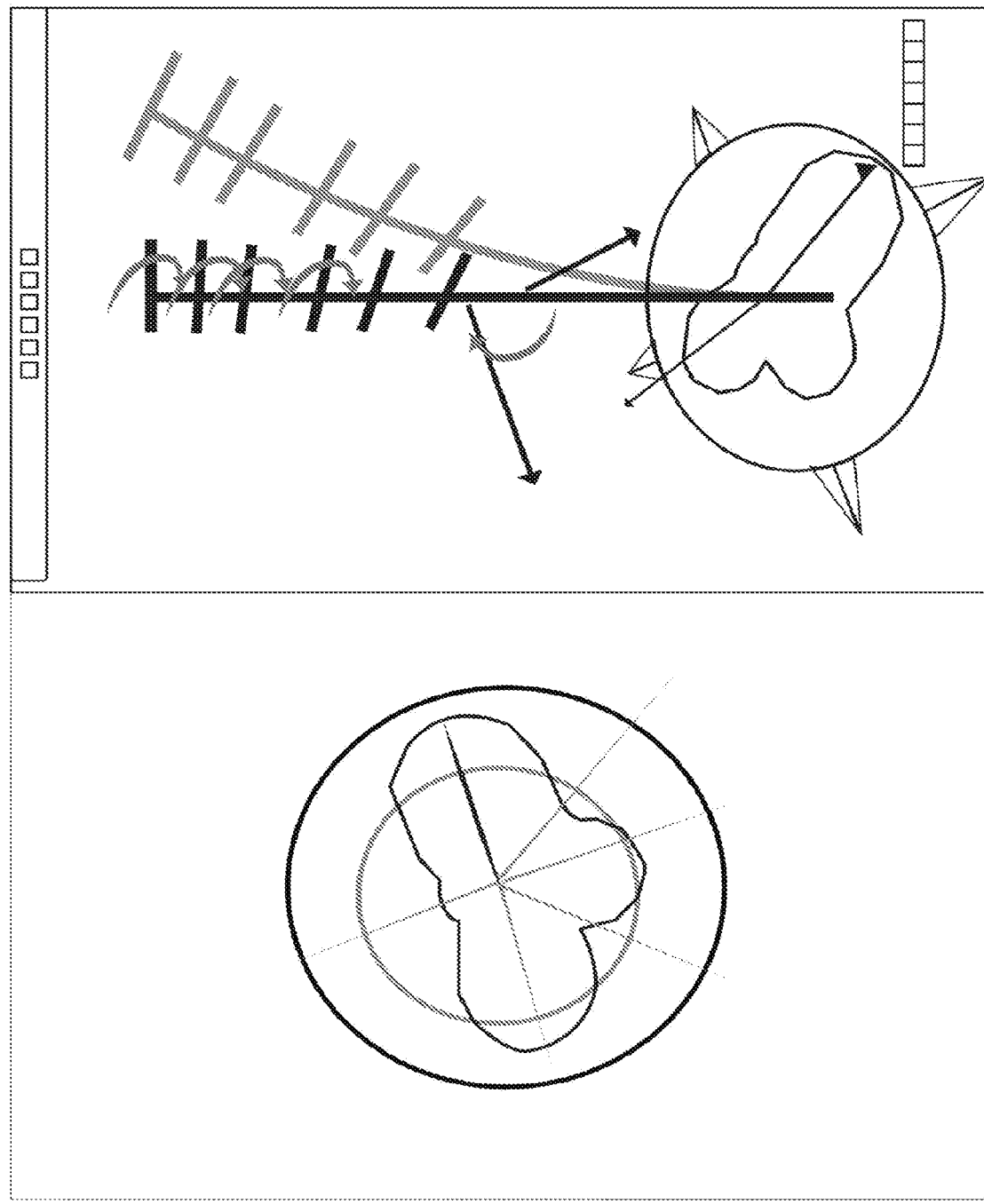

FIGS. 11A, 11B, and 11C also illustrate additional example interfaces disclosed herein. Particularly, systems and methods herein can conduct an analysis wind sweep, performing analysis at a variety of wind directions. At the end of each analysis direction, the percentage the structure is loaded is recorded and saved. At the conclusion of the wind sweep, when the worst-case wind direction is identified, the results of all the analyzed directions can be displayed in a 360 degree "radar chart," with color coding. Radar charts are accessible in both the analysis results data, and can also be visually shown under or at the base (or surface-contacting portion) the 3D model of the structure. As used herein, radar charts can include, e.g., drawings, on the ground or surface on which the utility structure rests or into which the utility structure is emplaced, depicting the worst-case loading of the utility structure, in every direction or for all loading states, when loaded and subjected to environmental conditions based on the analysis. Loading states can include the sum or net of all loads on a utility structure, and can include varying actual or theoretical wind components (which may be calculated as travelling parallel to the surface on or in which the utility structure rests, or may include three dimensional components), dynamic environmental conditions, as well as actual and theoretical loading or attachment (e.g., as-is, as-would-be with additional transformer or guy wire, et cetera).

FIG. 11A particularly depicts interface 1100 in which results pane 1110 includes radar chart 1116. Radar chart 1116 is superimposed over direction marking(s) 1114 and magnitude markings 1112. A dimensions box 1118 can also be provided for a selected direction. While the direction marking(s) 1114 and magnitude marking(s) 1112 are shown coarsely in FIG. 11A, it is understood that finer markings can be utilized within the scope and spirit of the innovation. Similar aspects are depicted in FIGS. 11B and 11C.

While this description does not include exhaustive detail for each interface, it is understood that aspects described with regard to one figure may be similarly implemented using aspects of other figures (e.g., menus or toolsets described with regard to one interface may be depicted and implemented in other interfaces where illustrated even if this description does not repeat such detail).

Figure 12:
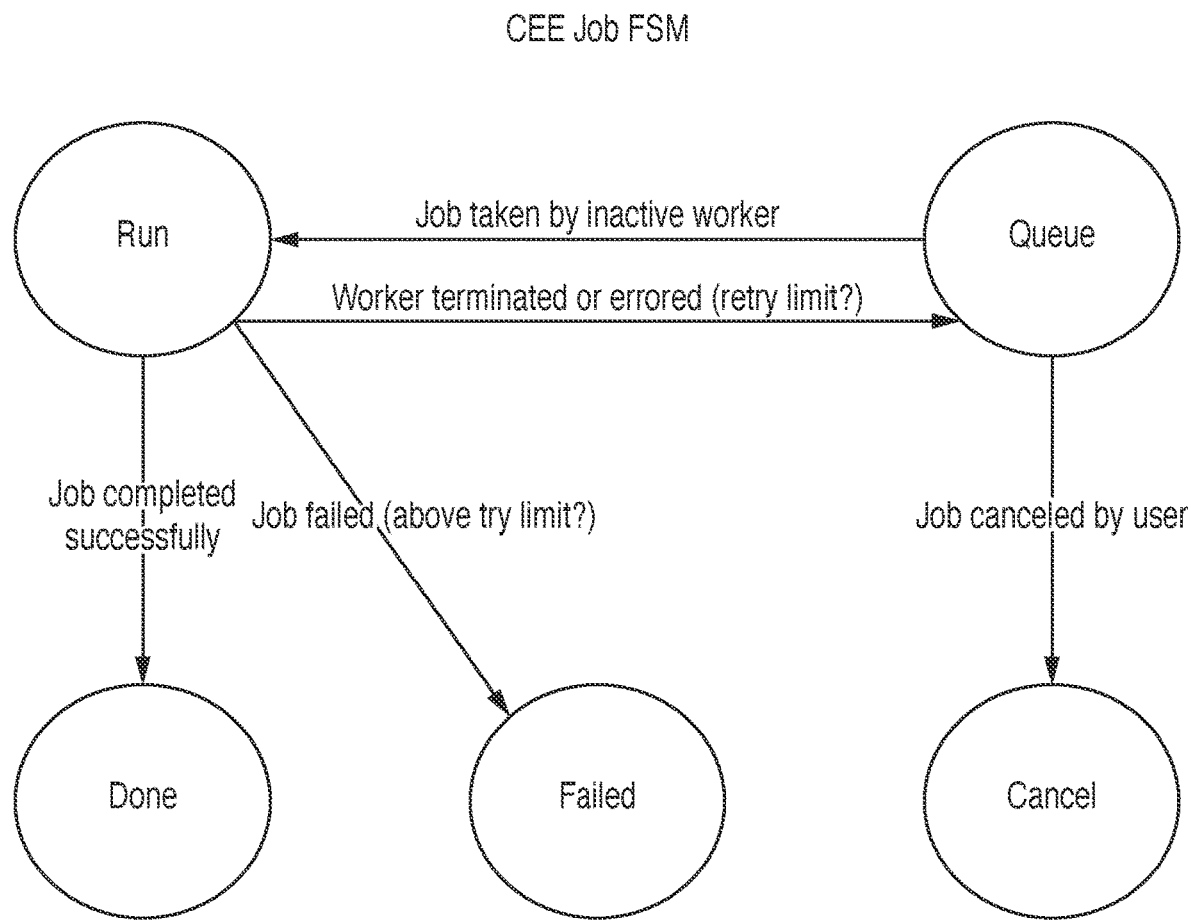
FIG. 12 depicts aspects disclosed herein.

FIGS. 12-16 illustrate aspects related to cloud-based processing for modeling and analysis described herein. FIG. 12 shows job handling using "workers," virtual engines or machines available in the CEE. FIG. 12 relates particularly to queueing, and depicts functionality related to, e.g., queuing modules herein.

CEE has the ability to process several hundred jobs a minute. Because of this, jobs can be prioritized to balance best-case, worst-case, and average-case batch execution times, as well as optimal packing for execution efficiency. CEE includes accurate job run time estimations, so a variety of different prioritization algorithms can be used.

CEE jobs can be reordered within a batch or globally across all batches, using the following formula:

$$P = A * SubmitTime + B * EstimatedJobTime$$

By tuning the A and B parameters different scheduling algorithms can be used, including but not limited to: first-come, first-served (A=−1, B=0); quickest jobs first (A=0, B=−1); slowest jobs first (A=0, B=1); weighted quickest jobs first (A=1, B=−1); and weighted slowest jobs first (A=1, B=−1). In embodiments, CEE can be configured to use slowest jobs first, but only reorder jobs within a batch and execute batches first-come, first-served. Alternative default configurations can be used without departing from the scope or spirit of the disclosure.

Figure 13:
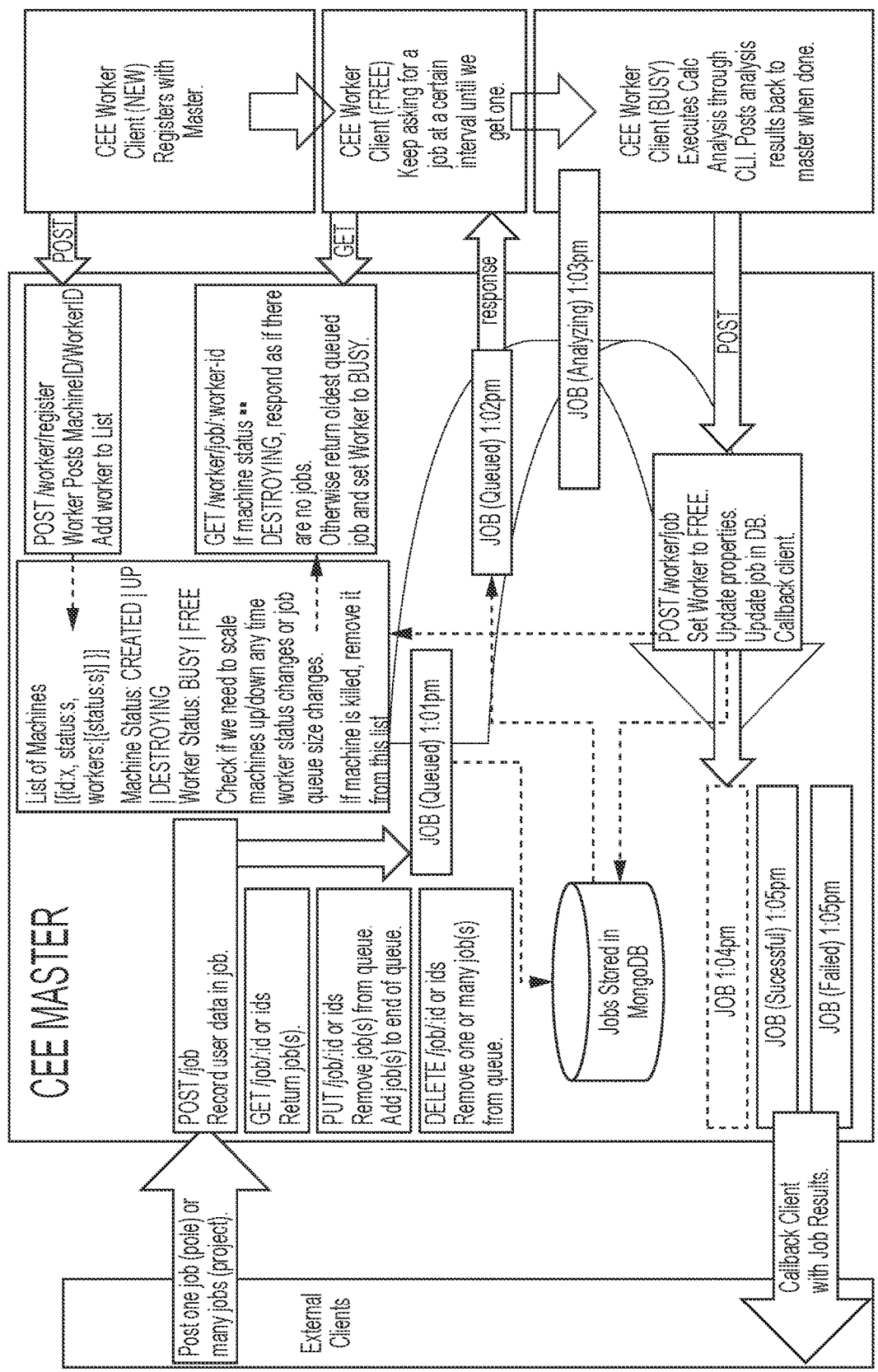
FIG. 13 depicts aspects disclosed herein.

FIG. 13 is an example diagram illustrating job flow using the CEE according to aspects disclosed herein.

Figure 14:
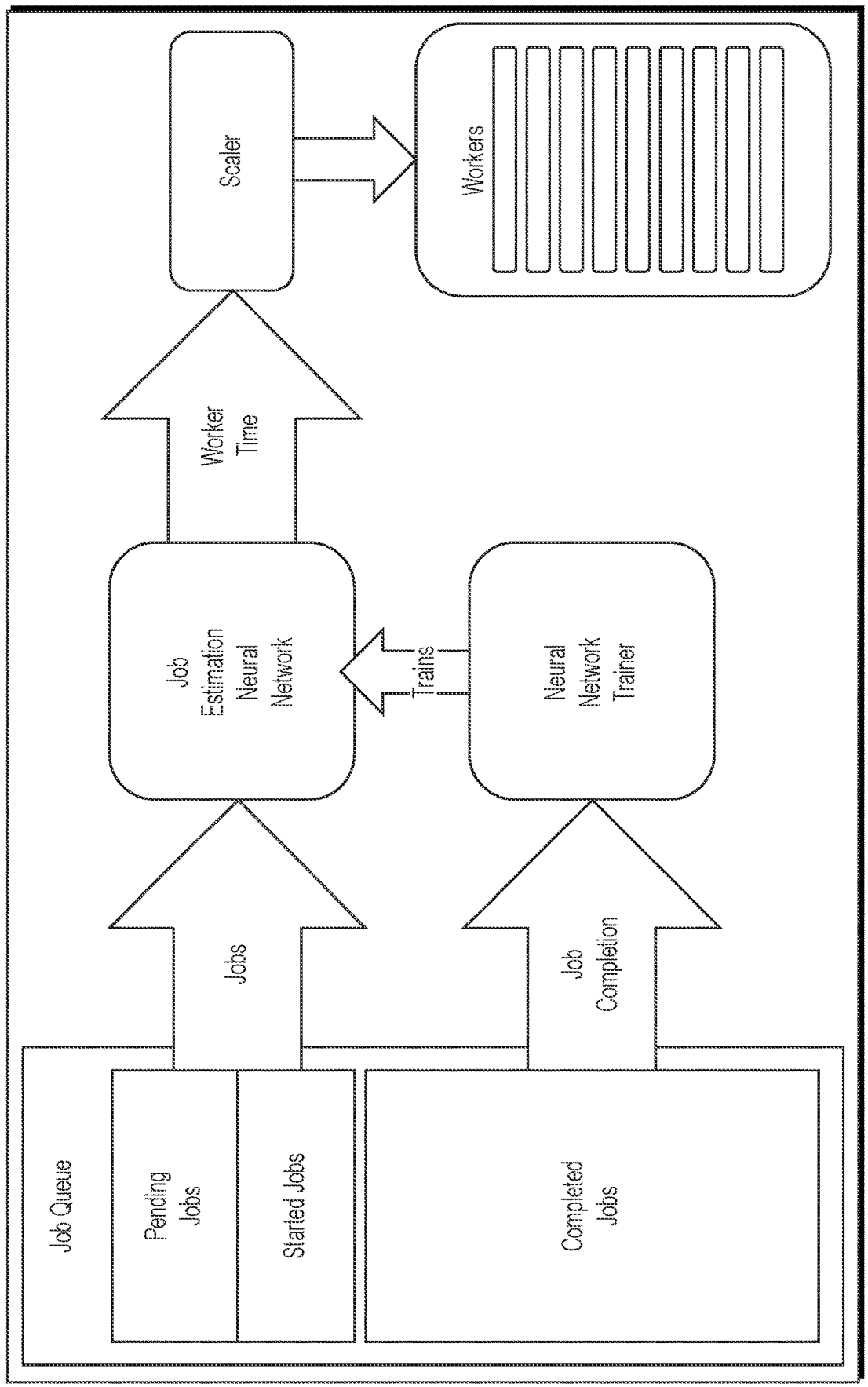
FIG. 14 depicts aspects disclosed herein.

FIG. 14 is an example diagram illustrating CEE scaling. The scaler controls workers based on worker time needed. Worker time needed can be actual, real-time numbers, projections or estimates, history-based benchmarks, or others. In an embodiment, worker time can be calculated according to the following equation:

$$W_{needed} = \operatorname{Min}\left(\frac{(T_{needed} + T_{remaining}) * S - T_{target} * N_{workers} * D}{T_{target} - T_{startup}} + B, N_{pending}\right)$$

where $W_{needed}$ is the estimated number of workers needed to complete jobs in $T_{target}$ time; $T_{needed}$ is the estimated amount of compute time needed to finish all jobs on a single worker (provided by Job Estimation NN); $T_{remaining}$ is the estimated time remaining on currently running jobs; S is a scaling factor; provides a tuning parameter to balance cost against time; $T_{target}$ is the target time of completion for all jobs to be completed; $N_{workers}$ is the number of currently running workers; D is, for previously completed jobs, the ratio of estimated completion time to actual completion time for currently running workers; $T_{startup}$ is the average time from starting a new worker until it becomes available to process jobs; B is a tuning parameter to ensure small jobs always complete faster on CEE than locally (balances cost vs. time); and $N_{pending}$ is the number of pending jobs.

Figure 15:
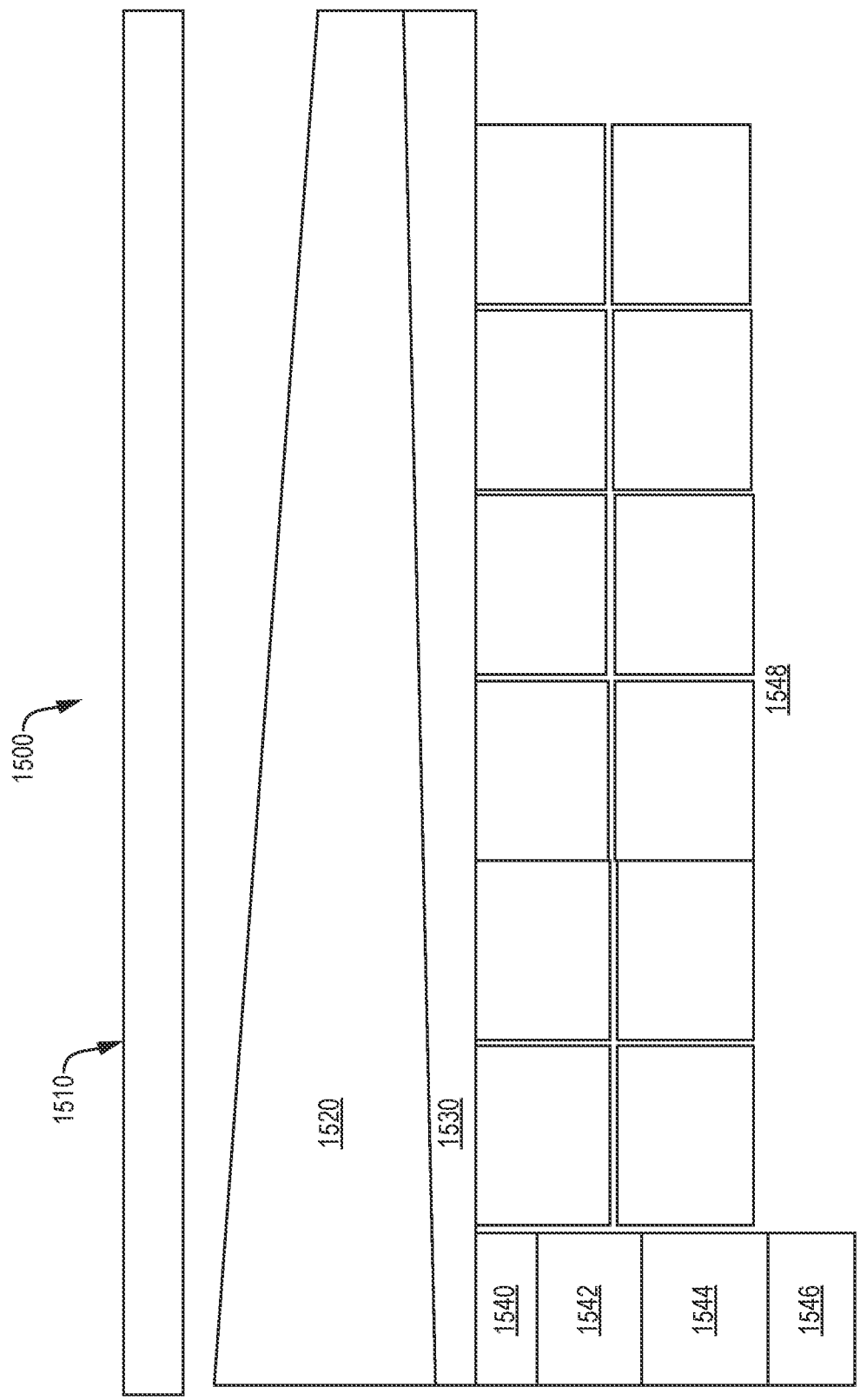
FIG. 15 depicts aspects disclosed herein.

FIG. 15 is a diagram illustrating CEE scaling and management 1500. Inactive and active jobs are tracked in queues along with statistics regarding resources available. Server details are shown by server, and resources available and used can be graphically depicted for quick reference. The diagram 1500 shows a menu bar 1510 that can include, e.g., profile, jobs, users, billing, report, accounts, system, and configuration. A results graph can show in queue 1520 and in queue 1530. Thereunder, included can be jobs table 1540 that describes the number of in queue and in progress jobs; servers table 1542 that describes the number of permanent, temporary, active, and inactive servers, as well as controls to add permanent or temporary servers; workers table 1544 that describes numbers of registered, busy, free, active, and inactive workers; and options table 1546 including auto-update, interval, and chart display selections. Various results tables 1548 are also displayed which describe servers, server identifiers, jobs, analyzing time, estimated analysis time, last heartbeat, and registered information.

Figure 16:
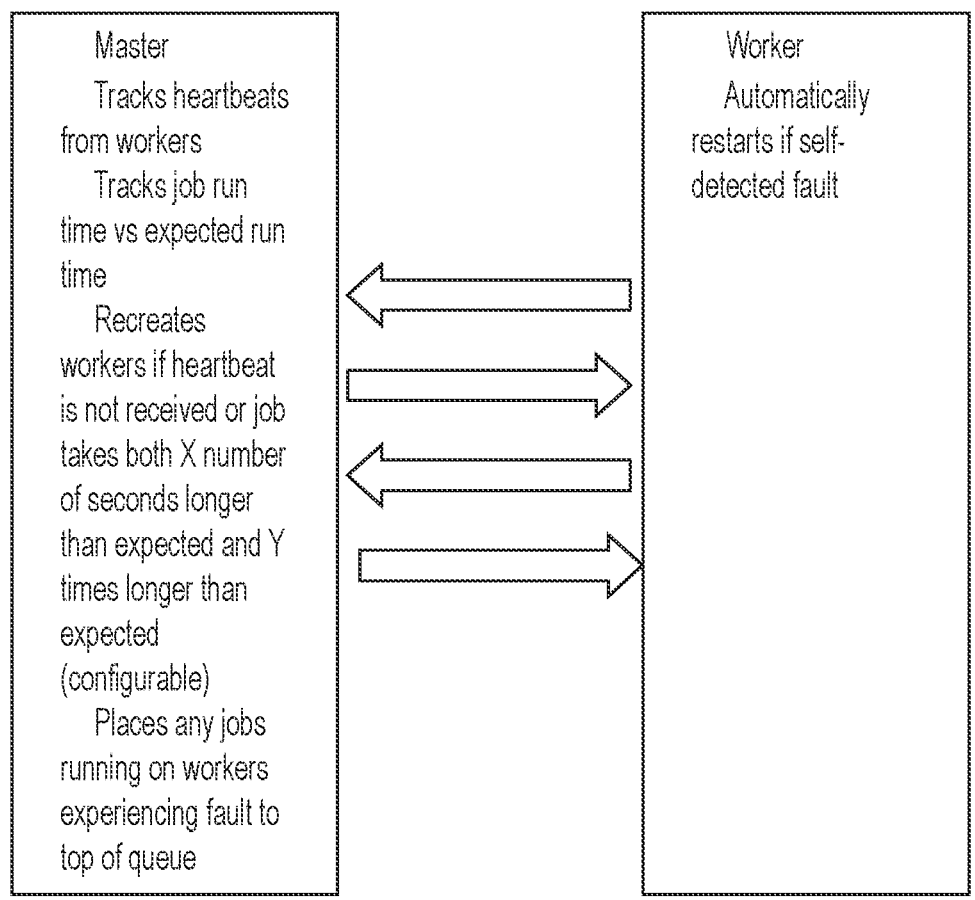
FIG. 16 depicts aspects disclosed herein.

Due to the nature of the cloud environment, the scale at which CEE can operate, and utilizing reduced cost pre- emptible servers, CEE workers often experience faults or are terminated unexpectedly. Because of this, CEE must be able to detect and handle any fault in workers while still making sure all jobs are executed. FIG. 16 is a diagram illustrating fault tolerance techniques used in accordance with the CEE.

Figure 17:
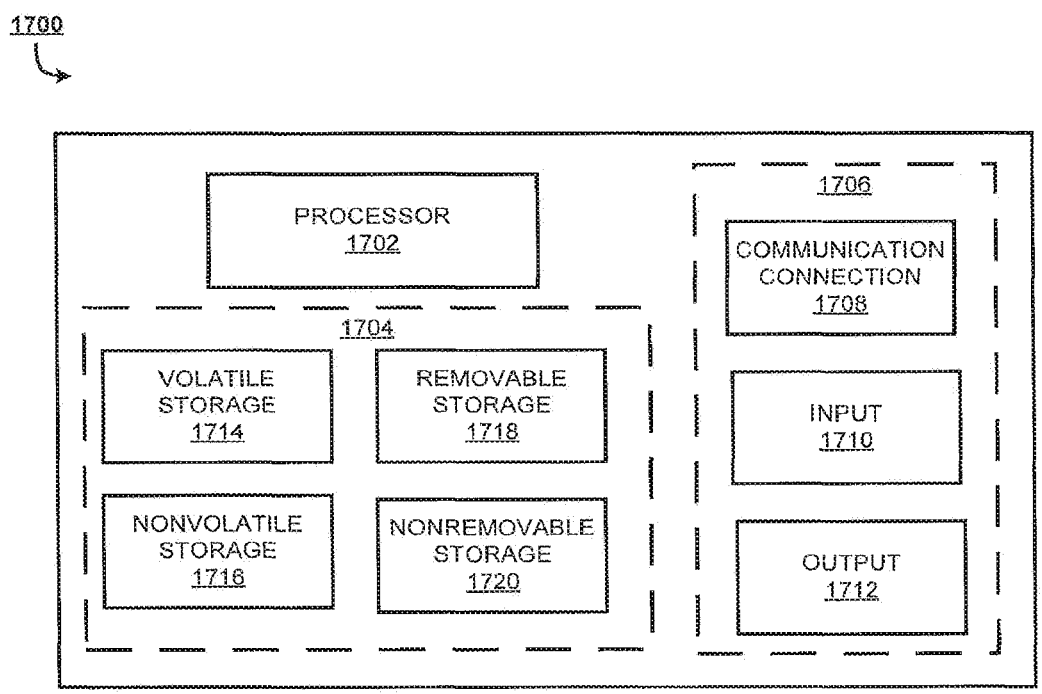
FIG. 17 depicts an example environment for practicing some aspects herein.
Figure 18:
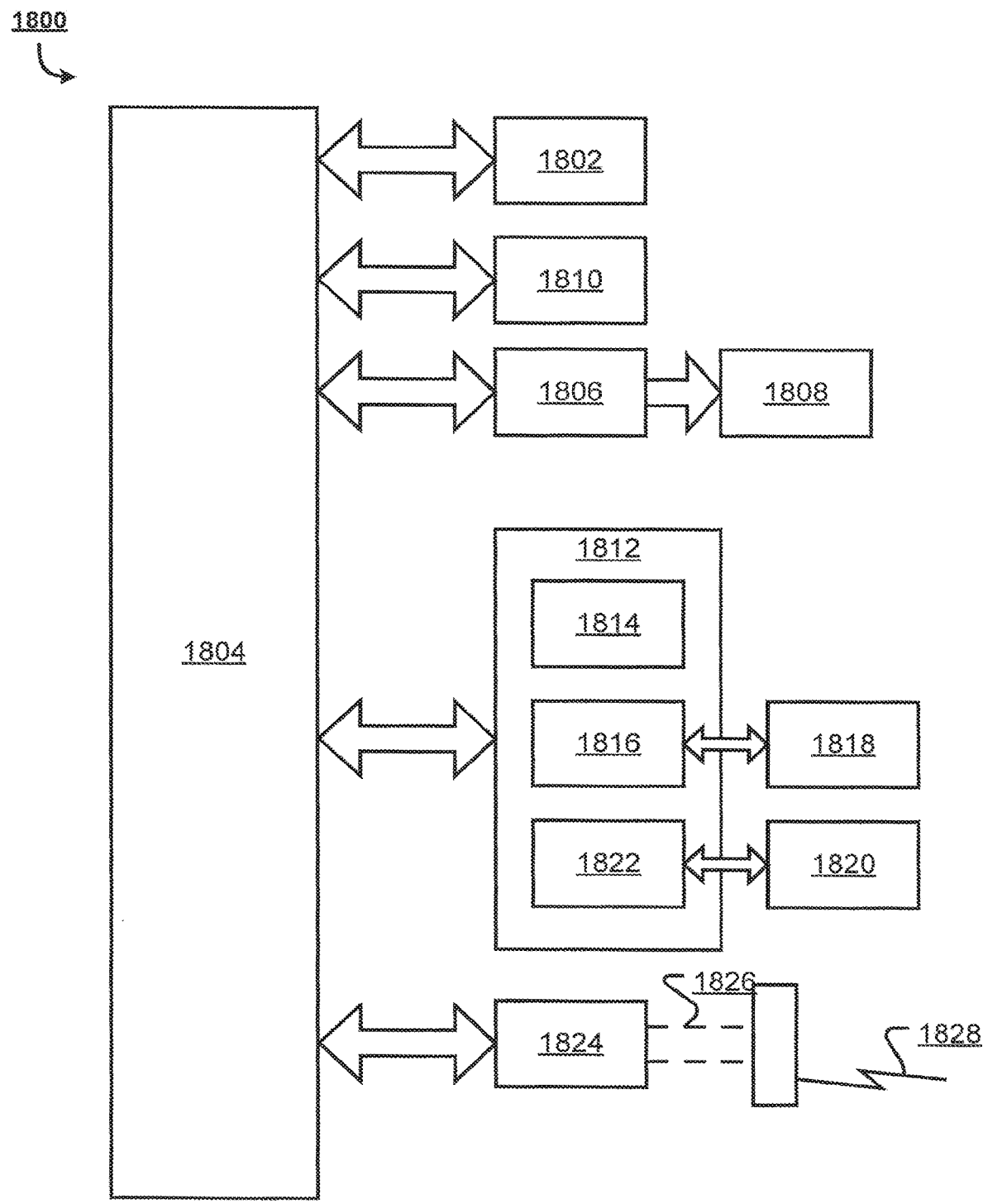
FIG. 18 depicts an example environment for practicing some aspects herein.

FIGS. 17 and 18 illustrate aspects for implementing portions of the disclosure herein. FIG. 17 illustrates a device 1700. Device 1700 may comprise all or a part of modules or components herein. Device 1700 may comprise hardware or a combination of hardware and software. The functionality to facilitate telecommunications via a telecommunications network may reside in one or combinations of links, portals, or connections. Device 1700 depicted in FIG. 17 may represent or perform functionality of an appropriate device 1700, or combination of modules or components herein. It is emphasized that the block diagram depicted in FIG. 17 is example and not intended to imply a limitation to a specific implementation or configuration. Thus, device 1700 may be implemented in a single device or multiple devices. Multiple network entities may be distributed or centrally located. Multiple network entities may communicate wirelessly, via hard wire, or any appropriate combination thereof.

Device 1700 may comprise a processor 1702 and a memory 1704 coupled to processor 1702. Memory 1704 may contain executable instructions that, when executed by processor 1702, cause processor 1702 to effectuate operations associated with aspects disclosed herein. As evident from the description herein, device 1700 is not to be construed as software per se.

In addition to processor 1702 and memory 1704, device 1700 may include an input/output system 1706. Processor 1702, memory 1704, and input/output system 1706 may be coupled together to allow communications there between. Each portion of device 1700 may comprise circuitry for performing functions associated with each respective portion. Thus, each portion may comprise hardware, or a combination of hardware and software. Accordingly, each portion of device 1700 is not to be construed as software per se. Input/output system 1706 may be capable of receiving or providing information from or to a communications device or other network entities configured for telecommunications. For example input/output system 1706 may include a wireless communications (e.g., WiFi/2.5G/3G/4G/GPS) card. Input/output system 1706 may be capable of receiving or sending video information, audio information, control information, image information, data, or any combination thereof. Input/output system 1706 may be capable of transferring information with device 1700. In various configurations, input/output system 1706 may receive or provide information via any appropriate means, such as, for example, optical means (e.g., infrared), electromagnetic means (e.g., RF, WiFi, Bluetooth®, ZigBee®), acoustic means (e.g., speaker, microphone, ultrasonic receiver, ultrasonic transmitter), or a combination thereof. In an example configuration, input/output system 1706 may comprise a WiFi finder, a two-way GPS chipset or equivalent, or the like, or a combination thereof.

Input/output system 1706 of device 1700 also may contain communication connection 1708 that allows device 1700 to communicate with other devices, network entities, or the like. Communication connection 1708 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 1706 also may include an input device 1710 such as keyboard, mouse, pen, voice input device, or touch input device. Input/output system 1706 may also include an output device 1712, such as a display, speakers, or a printer.

Processor 1702 may be capable of performing functions associated with aspects described herein. For example, processor 1702 may be capable of, in conjunction with any other portion of device 1700, performing aspects described herein.

Memory 1704 of device 1700 may comprise a storage medium having a concrete, tangible, physical structure. As is known, a signal does not have a concrete, tangible, physical structure. Memory 1704, as well as any computer-readable storage medium described herein, is not to be construed as a signal. Memory 1704, as well as any computer-readable storage medium described herein, is not to be construed as a transient signal. Memory 1704, as well as any computer-readable storage medium described herein, is not to be construed as a propagating signal. Memory 1704, as well as any computer-readable storage medium described herein, is to be construed as an article of manufacture.

Memory 1704 may store any information utilized in conjunction with telecommunications. Depending upon the exact configuration or type of processor, memory 1704 may include a volatile storage 1714 (such as some types of RAM), a nonvolatile storage 1716 (such as ROM, flash memory), or a combination thereof. Memory 1704 may include additional storage (e.g., a removable storage 1718 or a non-removable storage 1720) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by device 1700. Memory 1704 may comprise executable instructions that, when executed by processor 1702, cause processor 1702 to effectuate operations described herein.

FIG. 18 illustrates a computer-based system 1800 that may constitute or include parts of one or more of aspects of, e.g., FIGS. 1-3, or device 1700. Computer-based system 1800 includes at least one processor, such as a processor 1802. Processor 1802 may be connected to a communication infrastructure 1804, for example, a communications bus, a cross-over bar, a network, or the like. Various software aspects are described in terms of this example computer-based system 1800. Upon perusal of the present description, it will become apparent to a person skilled in the relevant art(s) how to implement the present disclosure using other computer systems or architectures.

Computer-based system 1800 includes a display interface 1806 that forwards graphics, text, or other data from communication infrastructure 1804 or from a frame buffer (not shown) for display on a display unit 1808.

Computer-based system 1800 further includes a main memory 1810, such as random access memory (RAM), and may also include a secondary memory 1812. Secondary memory 1812 may further include, for example, a hard disk drive 1814 or a removable storage drive 1816, representing a floppy disk drive, a magnetic tape drive, an optical disk drive, etc. Removable storage drive 1816 reads from or writes to a removable storage unit 1818 in a well-known manner. Removable storage unit 1818 may represent a floppy disk, magnetic tape, or an optical disk, and may be read by and written to by removable storage drive 1816. As will be appreciated, removable storage unit 1818 includes a computer usable storage medium having computer software or data stored therein.

In accordance with various aspects of the present disclosure, secondary memory 1812 may include other similar devices for allowing computer programs or other instructions to be loaded into computer-based system 1800. Such devices may include, for example, a removable storage unit 1820 and an interface 1822. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from removable storage unit 1820 to computer-based system 1800.

Computer-based system 1800 may further include communication interface 1824. Communication interface 1824 may allow software or data to be transferred between computer-based system 1800 and external devices. Examples of communication interface 1824 include, but may not be limited to a modem, a network interface (such as an Ethernet card), a communications port, a Personal Computer Memory Card International Association (PCMCIA) slot and card, or the like. Software or data transferred via communication interface 1824 may be in the form of a number of signals, hereinafter referred to as signals 1826, which may be electronic, electromagnetic, optical or other signals capable of being received by communication interface 1824. Signals 1826 may be provided to communication interface 1824 via a communication path (e.g., channel) 1828. Communication path 1828 carries signals 1826 and may be implemented using wire or cable, fiber optics, a telephone line, a cellular link, a radio frequency (RF) link, or other communication channels.

In this document, the terms "computer program medium" and "computer usable medium" are used to generally refer to media such as removable storage drive 1816, a hard disk installed in hard disk drive 1814, or the like. These computer program products provide software to computer-based system 1800. The present disclosure is directed to such computer program products.

Computer programs (also referred to as computer control logic) may be stored in main memory 1810 or secondary memory 1812. The computer programs may also be received via communication interface 1804. Such computer programs, when executed, enable computer-based system 1800 to perform the functions consistent with the present disclosure, as discussed herein. In particular, the computer programs, when executed, enable processor 1802 to perform the features of the present disclosure. Accordingly, such computer programs represent controllers of computer-based system 1800.

In accordance with an aspect of the present disclosure, where the disclosure is implemented using a software, the software may be stored in a computer program product and loaded into computer-based system 1800 using removable storage drive 1816, hard disk drive 1814, or communication interface 1824. The control logic (software), when executed by processor 1802, causes processor 1802 to perform the functions of the present disclosure as described herein.

In another aspect, the present disclosure is implemented primarily in hardware using, for example, hardware components, such as application specific integrated circuits (ASIC). Implementation of the hardware state machine to perform the functions described herein will be apparent to persons skilled in the relevant art(s). In yet another aspect, the present disclosure is implemented using a combination of both the hardware and the software. In another aspect, the present disclosure is implemented using software.

Various aspects disclosed herein are to be taken in the illustrative and explanatory sense, and should in no way be construed as limiting of the present disclosure. All numerical terms, such as, but not limited to, "first" and "second" or any other ordinary or numerical terms, should also be taken only as identifiers, to assist the reader's understanding of the various aspects, variations, components, or modifications of the present disclosure, and may not create any limitations, particularly as to the order, or preference, of any aspect, variation, component or modification relative to, or over, another aspect, variation, component or modification.

It is to be understood that individual features shown or described for one aspect may be combined with individual features shown or described for another aspect. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

The present disclosure is described herein with reference to system architecture, block diagrams, flowchart illustrations of methods, and computer program products according to various aspects of the disclosure. It will be understood that each functional block of the block diagrams and the flowchart illustrations, and combinations of functional blocks in the block diagrams and flowchart illustrations, respectively, can be implemented by computer program instructions.

These software elements may be loaded onto a general-purpose computer, special-purpose computer, or other programmable data processing apparatus to produce a machine, such that the instructions that execute on the computer or other programmable data-processing apparatus create means for implementing the functions specified in the flowchart block or blocks. These computer program instructions may also be stored in a computer-readable memory that can direct a computer or other programmable data-processing apparatus to function in a particular manner, such that the instructions stored in the computer-readable memory produce an article of manufacture including instruction means that implement the function specified in the flowchart block or blocks. The computer program instructions may also be loaded onto a computer or other programmable data-processing apparatus to cause a series of operational steps to be performed on the computer or other programmable apparatus to produce a computer-implemented process, such that the instructions that execute on the computer or other programmable apparatus provide steps for implementing the functions specified in the flowchart block or blocks. In an aspect, the computer program instructions may be executed on any remote-hosted application framework, for example, by a processor associated with a cloud server.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, websites, web forms, prompts, etc. Practitioners will appreciate that the illustrated steps described herein may comprise in any number of configurations including the use of windows, web pages, hypertexts, hyperlinks, web forms, popup windows, prompts, and the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Various sensors can be used with the example hardware or other hardware performing aspects described herein. Sensors can be hardware sensors, and can be borne on utility structures or used with or around utility structures to collect data for modeling and analysis. For example, sensors can be used to determine the geometry or orientation of a utility structure to more accurately model its real-world installation. Such sensors can include, e.g., cameras, levels, gyroscopes, rangefinders, compasses, global positioning systems, triangulation systems, et cetera. Such sensors can also observe and identify connections or attachments to determine a configuration of utility structures. Sensors can also be used to determine environmental conditions, which can influence loads (e.g., wind direction and speed, ice buildup) or material properties and wear (e.g., temperature, humidity or precipitation, soil measurements). Such sensors can include but are not limited to thermometers, barometers, humidity sensors, precipitation sensors, soil sensors, chemical sensors, et cetera.

As mentioned above, while exemplary embodiments have been described in connection with various computing devices, the underlying concepts may be applied to any computing device or system. Thus, the methods and systems of the present embodiments may be applied to a variety of applications and devices. While exemplary names and examples are chosen herein as representative of various choices, these names and examples are not intended to be limiting. One of ordinary skill in the art will appreciate that there are numerous ways of providing hardware and software implementations that achieves the same, similar or equivalent systems and methods achieved by the embodiments.

As is apparent from the above, all or portions of the various systems, methods, and aspects of the present embodiments may be embodied in hardware, software, or a combination of both. It is noted that the foregoing examples have been provided merely for the purpose of explanation and are in no way to be construed as limiting of the present embodiments. While the embodiments have been described with reference to various embodiments, it is understood that the words which have been used herein are words of description and illustration, rather than words of limitation. Further, although the embodiments have been described herein with reference to particular means, materials, the embodiments is not intended to be limited to the particulars disclosed herein; rather, the embodiments extend to all functionally equivalent structures, methods and uses, such as are within the scope of the appended claims.

What is claimed is:

1. A method comprising:
receiving inputs describing a utility structure, environmental conditions to which the utility structure is subjected including at least a wind sweep from a plurality of directions, and an analysis configuration;
instantiating one or more model engines on a local computing device or a cloud-based computing system;
generating, by the one or more model engines, a finite element model of the utility structure based on the inputs describing the utility structure, the environmental conditions, and the analysis configuration, the generating to identify one or more first elements of a support group where load is to be kept constant, identify one or more second elements of the support group where load is to be allowed to adjust with displacement, model the one or more first elements of the support group as loads, and model the one or more second elements of the support group as finite elements;
simulating a state of the finite element model to determine a loading of the utility structure due at least in part to the wind sweep from each of the plurality of directions;
generating, by the one or more model engines, a radar chart that represents a magnitude of the loading determined by the simulation by superimposing a drawing indicating the loading in each of the plurality of directions over direction markings for the loading that radiate from a representation of the utility structure, and magnitude markings for the loading that surround the representation of the utility structure; and
displaying the generated radar chart to a user in an interface shown on the local computing system.

2. The method of claim 1, wherein the representation of the utility structure, the direction markings, and the magnitude markings are placed over a representation of a surface or ground on which the utility structure rests or into which the utility structure is emplaced.

3. The method of claim 1, wherein the loading for a given direction is based on a sum of loads on the utility structure.

4. The method of claim 3, wherein the sum of loads includes actual wind components or load due to one or more actual attachments as part of an as-is scenario.

5. The method of claim 3, wherein the sum of loads includes theoretical wind components or load due to one or more theoretical attachments.

6. The method of claim 1, wherein the simulating the state of the finite element model further comprises determining a percentage the utility structure is loaded for each of the plurality of directions.

7. The method of claim 1, wherein the one or more first elements and the one or more second elements are each wires.

8. The method of claim 1, wherein the one or more model engines comprise a local modeling engine on the local computing device and one or more scalable modeling engines on the cloud-based computing system, and the instantiating instantiates the one or more scalable modeling engines on the cloud-based computing system in response to demand on the local model engine and computing resources available to the local model engine.

9. A non-transitory computer-readable medium storing instructions that when executed by one or more processors are operable to:
receive inputs describing a utility structure, environmental conditions to which the utility structure is subjected, and an analysis configuration;
generate a finite element model of the utility structure based on the inputs describing the utility structure, the environmental conditions, and the analysis configuration, the generation to identify one or more first elements of a support group where load is to be kept constant, identify one or more second elements of the support group where load is to be allowed to adjust with displacement, model the one or more first elements of the support group as loads, and model the one or more second elements of the support group as finite elements;
simulate a state of the finite element model to determine a loading of the utility structure for each of a plurality of directions;
generate a radar chart that represents a magnitude of the loading determined by the simulation by superimposing a drawing indicating the loading in each of the plurality of directions over direction markings for the loading that radiate from a representation of the utility structure, and magnitude markings for the loading that surround the representation of the utility structure; and
display the generated radar chart to a user.

10. The non-transitory computer-readable medium of claim 9, wherein the representation of the utility structure, the direction markings, and the magnitude markings are placed over a representation of a surface or ground on which the utility structure rests or into which the utility structure is emplaced.

11. The non-transitory computer-readable medium of claim 9, wherein the loading for a given direction is based on a sum of loads on the utility structure.

12. The non-transitory computer-readable medium of claim 11, wherein the sum of loads includes actual wind components or load due to one or more actual attachments as part of an as-is scenario.

13. The non-transitory computer-readable medium of claim 11, wherein the sum of loads includes theoretical wind components or load due to one or more theoretical attachments.

14. The non-transitory computer-readable medium of claim 9, wherein the instructions to generate the finite element model further comprise instructions that when executed are operable to:
determine a percentage the utility structure is loaded for each of the plurality of directions.

15. The non-transitory computer-readable medium of claim 9, wherein the one or more first elements and the one or more second elements are each wires.

* * * * *